(12) United States Patent
Oikawa et al.

(10) Patent No.: US 11,077,698 B2
(45) Date of Patent: Aug. 3, 2021

(54) VOLUME HOLOGRAM SHEET TO BE EMBEDDED, FORGERY PREVENTION PAPER, AND CARD

(71) Applicant: DAI NIPPON PRINTING CO., LTD., Tokyo-to (JP)

(72) Inventors: Nobuko Oikawa, Tokyo-to (JP); Minoru Azakami, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/376,410

(22) Filed: Apr. 5, 2019

(65) Prior Publication Data

US 2019/0232709 A1   Aug. 1, 2019

Related U.S. Application Data

(63) Continuation of application No. 15/435,973, filed on Feb. 17, 2017, now abandoned, which is a
(Continued)

(30) Foreign Application Priority Data

Jan. 19, 2010 (JP) ................................. 2010-009417
Mar. 3, 2010 (JP) ................................. 2010-046990

(51) Int. Cl.
*B42D 25/328* (2014.01)
*B42D 25/455* (2014.01)
(Continued)

(52) U.S. Cl.
CPC ............ *B42D 25/328* (2014.10); *B29C 65/48* (2013.01); *B29C 65/482* (2013.01);
(Continued)

(58) Field of Classification Search
CPC ...................................................... B42D 25/328
(Continued)

(56) References Cited

U.S. PATENT DOCUMENTS 4,889,366 A * 12/1989 Fabbiani ............... B42D 25/364
283/86
6,066,378 A    5/2000 Morii et al.
(Continued)

FOREIGN PATENT DOCUMENTS

DE    102006047721 A1    5/2007
EP       1168111 A2    1/2002
(Continued)

OTHER PUBLICATIONS

Huntsman; A Guide to thermoplastic polyurethanes (TPU); 26 pages (Copyright 2010) (Year 2010).
(Continued)

*Primary Examiner* — Kyle R Grabowski
(74) *Attorney, Agent, or Firm* — Locke Lord LLP

(57) ABSTRACT

An object of the present invention is to provide a thin volume hologram sheet to be embedded sufficiently resistant to a mechanical stress such as a stress including a tensile stress, a shear stress and a compression stress at the time of processing even under a heating condition, a forgery prevention paper and a card using the same. The object is achieved by providing a volume hologram sheet to be embedded comprising a volume hologram layer, and a substrate disposed only on one side surface of the volume hologram layer using an adhesion means, wherein a peeling strength of the volume hologram layer and the substrate is 25 gf/25 mm or more.

8 Claims, 4 Drawing Sheets

Related U.S. Application Data continuation of application No. 13/521,757, filed as application No. PCT/JP2011/050765 on Jan. 18, 2011, now abandoned.

(51) Int. Cl.

| | | |
|---|---|---|
| B42D 25/46 | (2014.01) | |
| G03H 1/00 | (2006.01) | |
| G03H 1/02 | (2006.01) | |
| B29C 65/48 | (2006.01) | |
| B42D 25/41 | (2014.01) | |
| B42D 25/355 | (2014.01) | |
| B42D 25/47 | (2014.01) | |
| B42D 25/475 | (2014.01) | |
| B29C 65/00 | (2006.01) | |
| G09F 3/00 | (2006.01) | |
| C09D 11/02 | (2014.01) | |
| D21H 21/42 | (2006.01) | |
| B29C 65/82 | (2006.01) | |
| B32B 37/12 | (2006.01) | |
| C09J 7/35 | (2018.01) | |
| B32B 7/12 | (2006.01) | |
| B32B 27/08 | (2006.01) | |
| B32B 27/32 | (2006.01) | |
| B32B 27/36 | (2006.01) | |
| B32B 37/18 | (2006.01) | |
| C09D 11/037 | (2014.01) | |
| C09D 11/106 | (2014.01) | |
| C09D 127/06 | (2006.01) | |
| C09D 131/04 | (2006.01) | |
| C09D 133/14 | (2006.01) | |
| C09J 11/06 | (2006.01) | |
| C09J 133/08 | (2006.01) | |
| D21H 21/40 | (2006.01) | |
| B29L 17/00 | (2006.01) | |
| B29K 633/00 | (2006.01) | |
| B29K 667/00 | (2006.01) | |

(52) U.S. Cl.
CPC ........ *B29C 65/483* (2013.01); *B29C 65/8223* (2013.01); *B29C 66/1122* (2013.01); *B29C 66/45* (2013.01); *B29C 66/71* (2013.01); *B29C 66/712* (2013.01); *B29C 66/733* (2013.01); *B32B 7/12* (2013.01); *B32B 27/08* (2013.01); *B32B 27/32* (2013.01); *B32B 27/36* (2013.01); *B32B 37/12* (2013.01); *B32B 37/182* (2013.01); *B42D 25/355* (2014.10); *B42D 25/41* (2014.10); *B42D 25/455* (2014.10); *B42D 25/46* (2014.10); *B42D 25/47* (2014.10); *B42D 25/475* (2014.10); *C09D 11/02* (2013.01); *C09D 11/037* (2013.01); *C09D 11/106* (2013.01); *C09D 127/06* (2013.01); *C09D 131/04* (2013.01); *C09D 133/14* (2013.01); *C09J 7/35* (2018.01); *C09J 11/06* (2013.01); *C09J 133/08* (2013.01); *D21H 21/40* (2013.01); *D21H 21/42* (2013.01); *G03H 1/0011* (2013.01); *G03H 1/0248* (2013.01); *G03H 1/0252* (2013.01); *G09F 3/0292* (2013.01); *B29C 65/485* (2013.01); *B29C 66/72328* (2013.01); *B29K 2633/00* (2013.01); *B29K 2667/003* (2013.01); *B29L 2017/001* (2013.01); *B32B 2037/1253* (2013.01); *B32B 2305/347* (2013.01); *B32B 2307/542* (2013.01); *B32B 2310/0843* (2013.01); *B32B 2310/14* (2013.01); *B32B 2317/12* (2013.01); *B32B 2333/00* (2013.01); *B32B 2367/00* (2013.01); *B32B 2425/00* (2013.01); *C09J 2301/414* (2020.08); *C09J 2433/00* (2013.01); *G03H 2240/50* (2013.01); *G03H 2250/35* (2013.01)

(58) Field of Classification Search
USPC ........................................... 283/904
See application file for complete search history.

(56) References Cited

U.S. PATENT DOCUMENTS

| | | | |
|---|---|---|---|
| 6,308,630 B1 | 10/2001 | Kurokawa et al. | |
| 6,596,360 B2 | 7/2003 | Toshine et al. | |
| 2001/0046630 A1* | 11/2001 | Toshine | B44C 1/1716 |
| | | | 283/86 |
| 2003/0124436 A1 | 7/2003 | Shioda et al. | |
| 2006/0019172 A1* | 1/2006 | Ohtaki | G03H 1/0256 |
| | | | 283/86 |
| 2006/0275671 A1 | 12/2006 | Eto et al. | |
| 2010/0104952 A1* | 4/2010 | Azakami | G03H 1/0248 |
| | | | 359/3 |
| 2010/0165425 A1 | 7/2010 | Tompkin et al. | |
| 2015/0220056 A1* | 8/2015 | Weiser | B42D 25/328 |
| | | | 359/2 |

FOREIGN PATENT DOCUMENTS

| | | | |
|---|---|---|---|
| JP | 2002-307879 A | 10/2002 | |
| JP | 2003-213597 A | 7/2003 | |
| JP | 2003-306896 A | 10/2003 | |
| JP | 2004-037623 A | 2/2004 | |
| JP | 2007-108253 A | 4/2007 | |
| WO | WO-2008105510 A1 * | 9/2008 | ............... G03H 1/18 |

OTHER PUBLICATIONS

International Search Report dated Feb. 22, 2011; PCT/JP2011/050765.
Extended European Search Report dated Sep. 12, 2013; Appln. No. 11734636.1.
USPTO NFOA dated Nov. 29, 2013 in U.S. Appl. No. 13/521,757.
USPTO NFOA dated Apr. 22, 2014 in U.S. Appl. No. 13/521,757.
USPTO NFOA dated Nov. 10, 2014 in U.S. Appl. No. 13/521,757.
USPTO NFOA dated Mar. 13, 2015 in U.S. Appl. No. 13/521,757.
USPTO NFOA dated Jul. 22, 2015 in U.S. Appl. No. 13/521,757.
USPTO FOA dated Oct. 30, 2015 in connection with U.S. Appl. No. 13/521,757.
USPTO FOA dated Feb. 11, 2016 in connection with U.S. Appl. No. 13/521,757.
USPTO FOA dated Aug. 17, 2016 in connection with U.S. Appl. No. 13/521,757.
USPTO Notice of Abandonment dated Mar. 23, 2017 in connection with U.S. Appl. No. 13/521,757.
USPTO FOA dated Oct. 3, 2017 in connection with U.S. Appl. No. 15/435,973.
USPTO NFOA dated Apr. 12, 2018 in connection with U.S. Appl. No. 15/435,973.
USPTO FOA dated Nov. 9, 2018 in connection with U.S. Appl. No. 15/435,973.

* cited by examiner

VOLUME HOLOGRAM SHEET TO BE EMBEDDED, FORGERY PREVENTION PAPER, AND CARD

TECHNICAL FIELD

The present invention relates to a volume hologram sheet to be embedded used for applications such as a forgery prevention paper and a card.

BACKGROUND ART

Hologram is a technology with the wave front of the object light beam recorded as interference fringes on a photosensitive material by interference of two light beams of the same wavelength (an object light beam and a reference light beam) so as to generate the diffraction phenomenon by the interference fringes when a light beam of the wavelength same as that of the reference light beam at the time of recording the interference fringes is directed for reproducing the wave front same as that of the original object light beam. Since such a hologram has advantages such as a beautiful external appearance and difficulty in copy production, it is often used for security application, and the like. In particular, in the field of plastic cards represented by credit cards and cash cards, cards with a hologram have widely been used mainly in terms of preventing copy production and providing a design value.

The hologram can be classified into several groups according to the recording form of the interference fringes. Representatives are the surface relief hologram and the volume hologram. Here, the surface relief hologram has a hologram image recorded by forming a minute rugged pattern on the hologram layer surface. On the other hand, the volume hologram has a hologram image recorded by providing three-dimensionally in the thickness direction interference fringes generated by interference of a light as fringes of different refractive indices. Among them, since the volume hologram has a hologram image recorded by the refractive index difference of the materials, it is advantageous in that copying thereof is difficult compared with the relief hologram so that applications as forgery prevention means of securities and cards are expected.

Many examples are known for use of the holograms as forgery prevention means or design improving means. As an example thereof, a thread hologram used for various paper media is presented.

The thread hologram is formed in a part of the paper medium for the purpose of forgery prevention of a paper medium with a property value such as securities. Since such a thread hologram is formed only in a part of the paper medium, a high forgery prevention effect can be performed and a design property can be provided to the paper medium, the surface relief hologram is nowadays used widely for various paper media. Moreover, the forgery prevention performance can be improved by using a volume hologram for the hologram.

The paper medium with the thread hologram formed is produced in general by introducing a hologram sheet for thread into the paper medium at the time of making a paper medium. Here, in the step of introducing the hologram sheet for a thread into the paper medium (hereafter, it may be referred to as the introducing step), since the hologram sheet for a thread is introduced into the paper medium in general by being drawn mechanically under a heating condition, in order to endure the introducing step, the hologram sheet for a thread should have a high mechanical strength with respect to the tensile stress or shear stress under the heating condition, that is, a high mechanical resistance with respect to a mechanical stress such as the tensile stress and the shear stress.

Here, the Patent Literature 1 discloses a technique of providing a high endurance under a heating condition by making the layer configuration of a volume hologram sheet for a thread of a first protection layer/a volume hologram layer/a second protection layer as the hologram sheet for a thread of the volume hologram. However, although the volume hologram for a thread sheet of the Patent Literature 1 has the resistance with respect to the mechanical stress such as the tensile stress and the shear stress under a heating condition to some extent, since the film thickness is bulky due to the need of the two layers of the protection layer, the paper medium with the volume hologram sheet for a thread introduced has ruggedness on the surface so that it is problematic in that the paper medium with a smooth surface can hardly be obtained.

Therefore, a thin film volume hologram sheet for a thread with the excellent resistance with respect to the mechanical stress such as the tensile stress and the shear stress under a heating condition has been desired.

Moreover, as another example of using the hologram as a forgery prevention means or a design property improving means, a card with the hologram is known.

As a method for providing a hologram to a card, for example, a method of attaching a hologram seal, a method of transferring a hologram from a hologram transfer foil, and a method of embedding a hologram in a card medium so as to be visible from the outside can be presented.

Although the method of attaching a hologram seal and the method of transferring a hologram are simple, there are risks of the hologram being peeled off and used for a different purpose. In particular, the volume hologram tends to be thicker than the surface relief hologram due to its characteristic of recording a hologram image by the three-dimensional arrangement of a refractive index difference. Therefore, a grade difference may be generated on the card surface due to the volume hologram thickness so as to deteriorate the design properties and lead to forgery by easiness in peeling off the hologram.

On the other hand, in the case of the method of embedding a hologram in a card medium, forgery can be prevented because it is difficult to peel off the hologram. For example, the Patent Literature 2 discloses a card with a hologram disposed between a core sheet and an over sheet. According to such a card, since the over sheet is thicker than the hologram, the trouble derived from the grade difference due to the volume hologram thickness can be alleviated.

At the time of embedding a hologram in a card medium, for example, as mentioned in the Patent Literature 2, the core sheet and the over sheet with the hologram disposed are laminated and integrated by press-lamination under a heating condition. At the time, in the case the hologram has the hologram layer formed on a substrate, a problem is involved in that the air enveloped in the hologram goes out for generating bubbles between the substrate and the hologram layer at the time of heat press so as to cause exfoliation of the hologram layer. Moreover, it is also problematic that the substrate and the hologram layer are displaced at the time of the heat press. Therefore, in order to endure such a step, the hologram should have a high resistance with respect to the mechanical stress such as compression stress under a heating condition.

As heretofore mentioned, a hologram sheet to be embedded used in the case of introducing the same into a paper medium or embedding the same into a card medium is desired to have the excellent resistance with respect to a mechanical stress under a predetermined heating condition.

CITATION LIST

Patent Literature

Patent Literature 1: Japanese Patent Application Publication Laid-Open (JP-A) No. 2007-108253
Patent Literature 2: JP-A No. 2002-307879

SUMMARY OF INVENTION

Technical Problem

The present invention has been achieved in view of the above-mentioned circumstances, and its main object is to provide a thin volume hologram sheet to be embedded sufficiently resistant to a mechanical stress at the time of processing even under a heating condition, a forgery prevention paper and a card using the same.

Solution to Problem

In order to obtain a thin volume hologram sheet for a thread to be introduced into a paper medium under a heating condition as described above, the present inventors have tried to provide a resistance to a sufficient mechanical stress such as a tensile stress and a shear stress at the time of processing under a heating condition as described above to a volume hologram sheet having a layer configuration of a volume hologram layer and a substrate disposed only on one side surface of the volume hologram layer. Moreover, in order to obtain a thin volume hologram sheet for a card to be embedded into a card medium under a heating condition as mentioned above, the present inventors have tried to provide a sufficient resistance to a mechanical stress such as a compression stress to a volume hologram sheet at the time of processing under a heating condition as described above. Then, as a result of elaborate study, they have found out that a sufficient resistance to a mechanical stress such as a stress including a tensile stress, a shear stress and a compression stress can be realized at the time of processing even under a heating condition as described above by having the peeling strength of the volume hologram layer and the substrate of 25 gf/25 mm or more so as to complete the present invention.

That is, the present invention provides a volume hologram sheet to be embedded comprising: a volume hologram layer, and a substrate disposed only on one side surface of the volume hologram layer using an adhesion means, wherein a peeling strength of the volume hologram layer and the substrate is 25 gf/25 mm or more.

According to the present invention, since the peeling strength of the volume hologram layer and the substrate is 25 gf/25 mm or more, at the time of producing a forgery prevention paper, a card, and the like using the volume hologram sheet to be embedded under a heating condition, a volume hologram sheet to be embedded can be provided with a resistance to a mechanical stress such as a tensile stress, a shear stress and a compression stress to the extent that problems including exfoliation of the volume hologram layer, bubble generation between the volume hologram layer and the substrate, and displacement of the volume hologram layer and the substrate are not generated. Moreover, since the volume hologram sheet to be embedded can be provided as a thin film, even in the case of introducing the same in a paper medium in the introducing step or in the case of embedding the same in a card medium, the surface of the paper medium or the card can be smooth.

In the present invention, it is preferable that a main component of a resin material used in the volume hologram layer is an acrylic resin material, and the substrate is made of a polyester resin. Since the volume hologram layer containing a resin material as the main component and the substrate made of the resin are used, at the time of producing a forgery prevention paper, a card, and the like under a heating condition, a preferable mechanical strength with respect to a stress such as a tensile stress, a shear stress and a compression stress can be provided.

In the present invention, it is preferable that the adhesion means is an adhesive layer, and an adhesive used for the adhesive layer is a curable adhesive. Since a curable adhesive is used for the adhesive layer, at the time of producing a forgery prevention paper, a card, and the like under a heating condition, the volume hologram sheet to be embedded of the present invention is provided with a preferable resistance with respect to a mechanical stress such as a tensile stress, a shear stress, and a compression stress.

In the present invention, it is preferable that the adhesion means is an easy adhesion process, and the easy adhesion process is a chemical process using a primer agent. Since the chemical process using a primer agent is carried out, the volume hologram sheet to be embedded of the present invention is provided with a preferable resistance with respect to a mechanical stress such as a tensile stress, a shear stress, and a compression stress at the time of producing a forgery prevention paper, a card, and the like under a heating condition.

It is preferable that the volume hologram sheet to be embedded of the present invention is a volume hologram sheet for a thread. According to the present invention, since the peeling strength of the volume hologram layer and the substrate is 25 gf/25 mm or more, at the time of producing a forgery prevention sheet, and the like using the volume hologram sheet for a thread under a heating condition, a volume hologram sheet for a thread having a mechanical strength with respect to a tensile stress and a shear stress to the extent that a problem of exfoliation of the volume hologram layer, and the like is not generated can be provided. Moreover, since the volume hologram sheet for a thread can be a thin film, the paper medium surface can be made smooth even in the case of being introduced into a paper medium in the introducing step.

Moreover, it is also preferable that the volume hologram sheet to be embedded of the present invention is a volume hologram sheet for a card. According to the present invention, since the peeling strength of the volume hologram layer and the substrate is 25 gf/25 mm or more, at the time of producing a card using the volume hologram sheet for a card under a heating condition, a volume hologram sheet for a card having a resistance with respect to a mechanical stress such as a compression stress to the extent that problems such as the bubble generation between the volume hologram layer and the substrate, and the displacement of the volume hologram layer and the substrate are not generated can be provided.

The present invention provides a forgery prevention paper, wherein the above-mentioned volume hologram sheet to be embedded is used.

Moreover, the present invention provides a card, wherein the above-mentioned volume hologram sheet to be embedded is disposed between two sheets.

According to the present invention, since the volume hologram sheet to be embedded is used, a problem is not involved at the time of the production, and a high forgery prevention effect can be performed.

Advantageous Effects of Invention

In the present invention, since the peeling strength of the volume hologram layer and the substrate is 25 gf/25 mm or more, a thin volume hologram sheet to be embedded can be provided with a sufficient resistance with respect to a mechanical stress such as a tensile stress, a shear stress and a compression stress even at the time of processing under a heating condition.

DESCRIPTION OF EMBODIMENTS

Hereafter, the volume hologram sheet to be embedded, the forgery prevention paper and the card of the present invention will be explained, respectively.

A. Volume Hologram Sheet to be Embedded

The volume hologram sheet to be embedded of the present invention comprises; a volume hologram layer, and a substrate disposed only on one side surface of the volume hologram layer using an adhesion means, characterized in that a peeling strength of the volume hologram layer and the substrate is 25 gf/25 mm or more.

Here, the peeling strength in the present invention is a value measured based on the 180 degree peeling test of JIS Z0237. The tensile tester to be used is for example an Instron 5565 Type™ material tester. A test piece is prepared by cutting a hologram sheet by a 25 mm width and a 150 mm length, attaching a double side adhesive tape of the same size on the volume hologram layer side, and further attaching the same onto a SUS plate so as to be fixed for peeling off the substrate film by a 300 mm per minute rate for measuring the tensile load (gf) in a state with the peeling operation carried out stably as the peeling strength of the 25 mm width. Moreover, as to a sample of less than a 25 mm width, with the width thereof being "a" mm, the value obtained by multiplying the peeling strength measured in the same manner for the "a" mm width by 25/a is regarded as the peeling strength of the 25 mm width.

Figure 1:
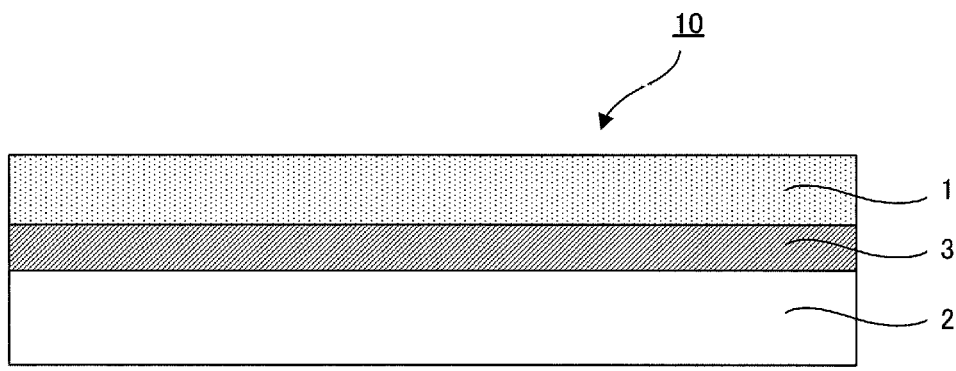
FIG. 1 is a schematic cross-sectional view showing an embodiment of a volume hologram sheet to be embedded of the present invention.

Next, the volume hologram sheet to be embedded of the present invention will be explained with reference to the drawings. FIG. 1 is a schematic cross-sectional view showing an embodiment of a volume hologram sheet to be embedded of the present invention. As shown in FIG. 1, the volume hologram sheet to be embedded 10 of the present invention comprises a volume hologram layer 1, and a substrate 2 disposed on only on one side surface of the volume hologram layer 1 using an adhesive layer 3.

Figure 2:
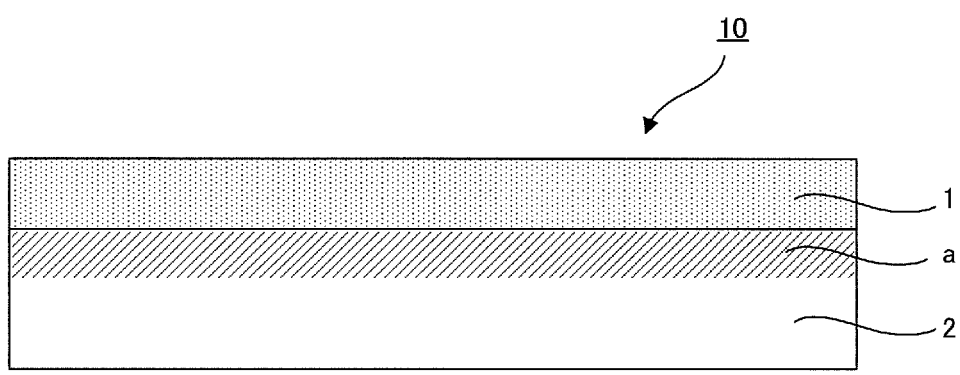
FIG. 2 is a schematic cross-sectional view showing another embodiment of a volume hologram sheet to be embedded of the present invention.

Moreover, in the present invention, the volume hologram layer 1 and the substrate 2 may be bonded and disposed by applying an easy adhesion process "a" to the surface of the substrate 2 as shown in FIG. 2 instead of using the adhesive layer 3 as the adhesion means as shown in FIG. 1. Moreover, either in the case of using the adhesive layer 3 or the easy adhesion process "a" as the adhesion means, the present invention is characterized in that the peeling strength of the volume hologram layer 1 and the substrate 2 is 25 gf/25 mm or more.

Here, at the time of producing a forgery prevention paper, and the like using the volume hologram sheet to be embedded (volume hologram sheet for a thread), since the volume hologram sheet for a thread is introduced into a paper medium by mechanically drawing under a heating condition, a resistance with respect to a mechanical stress such as a tensile stress and a shear stress under a heating condition is indispensable to the extent that it can endure the process. According to a volume hologram sheet for a thread having a layer configuration of a first protection layer/a volume hologram layer/a second protection layer conventionally proposed, a resistance with respect to the mechanical stress such as a tensile stress and a shear stress under a heating condition can be provided to some extent. However, since the film thickness is bulky due to the need of the two layers of the protection layer, the paper medium with the volume hologram sheet for a thread introduced has ruggedness on the surface so that a problem is involved in that the paper medium with a smooth surface can hardly be obtained.

Moreover, at the time of embedding the volume hologram sheet to be embedded (volume hologram sheet for a card) in a card medium, since the card medium and the volume hologram sheet are pressed under a heating condition, the volume hologram sheet is required to have a resistance with respect to a mechanical stress such as a compression stress under a heating condition to the extent that it can endure such a process.

As heretofore mentioned, it is desired that the volume hologram sheet to be embedded such as a volume hologram sheet for a thread and a volume hologram sheet for a card has the excellent resistance with respect to a mechanical stress under a heating condition.

Then, the present inventors have tried to use a volume hologram sheet having a layer configuration of a volume hologram layer and a substrate disposed on only one side surface of the volume hologram layer for a volume hologram sheet for a thread or a volume hologram sheet for a card.

However, it was known that in the case the above-mentioned volume hologram sheet having the layer configuration is really introduced into a paper medium, the volume hologram sheet does not have a resistance with respect to a mechanical stress such as a tensile stress and a shear stress under a heating condition to the extent that it endures a process due to exfoliation of the volume hologram layer form the volume hologram sheet or exfoliation of the volume hologram layer. As a result of the elaborate discussion of the present inventors in order to solve the problem, it was found out that with a peeling strength of 25 gf/25 mm or more of the volume hologram layer and the substrate of the volume hologram sheet having the layer configuration in the above described peeling strength measuring method, problems of the exfoliation of the volume hologram layer, and the like are not generated in the case of producing a forgery prevention paper, and the like using the volume hologram sheet having the layer configuration under a heating condition.

Moreover, in the case of really embedding the volume hologram sheet having the layer configuration in a card medium, it was learned that the volume hologram layer is peeled off from the volume hologram sheet due to bubble generation between the substrate and the hologram layer, that the substrate and the hologram layer are displaced, and that the volume hologram sheet does not have a resistance with respect to a mechanical stress such as a compression stress under a heating condition to the extent that it can endure the process due to the bubbles between the substrate and the volume hologram layer and the displacement of the substrate and the hologram layer. As a result of the elaborate discussion of the present inventors in order to solve the problem, it was found out that the problems of bubble generation between the substrate and the volume hologram layer, displacement of the substrate and the volume hologram layer, and the like are not generated even in the case of producing a card using the volume hologram sheet having the layer configuration under a heating condition if the peeling strength of the volume hologram layer and the substrate of the volume hologram sheet having the layer configuration is 25 gf/25 mm or more in the above-mentioned measuring method of the peeling strength.

Based on these findings, the present inventors have completed the present invention.

According to the present invention, since the peeling strength of the volume hologram layer and the substrate is 25 gf/25 mm or more, even with the configuration having the substrate disposed using the adhesion means only on one side of the volume hologram layer, at the time of producing a forgery prevention paper, and the like using the volume hologram sheet to be embedded (volume hologram sheet for a thread), a volume hologram sheet to be embedded (volume hologram sheet for a thread) having a resistance with respect to a mechanical stress such as a tensile stress and a shear stress under a heating condition to the extent that the problems of the exfoliation of the volume hologram layer, and the like are not generated can be provided.

Moreover, since the volume hologram sheet to be embedded (volume hologram sheet for a thread) of the present invention has a configuration with the substrate disposed using the adhesion means only on one side of the volume hologram layer, the volume hologram sheet to be embedded (volume hologram sheet for a thread) can be provided as a thin film, and thus the paper medium surface can be made smooth in the case of introducing the same into a paper medium in the introducing step.

Moreover, according to the present invention, since the peeling strength of the volume hologram layer and the substrate is 25 gf/25 mm or more, even with the configuration having the substrate disposed using the adhesion means only on one side of the volume hologram layer, at the time of producing a card using the volume hologram sheet to be embedded, a volume hologram sheet to be embedded having a resistance with respect to a mechanical stress such as a compression stress under a heating condition to the extent that a problem of bubble generation between the volume hologram layer and the substrate, displacement of the volume hologram layer and the substrate, and the like is not generated can be provided.

Moreover, since the volume hologram sheet to be embedded of the present invention has a configuration with the substrate disposed using an adhesion means only on one side surface of the volume hologram layer, the volume hologram sheet to be embedded can be provided as a thin film so that the card surface can be made smooth in the case of embedding the same into a card medium.

Here, the "volume hologram sheet to be embedded" in the present invention denotes a volume hologram sheet used in the case of embedding a hologram in a medium. Examples include a volume hologram sheet for a thread used in the case of introducing a hologram into a paper medium and a volume hologram sheet for a card used in the case of embedding a hologram into a plastic card medium.

The "mechanical strength with respect to a tensile stress and a shear stress under a heating condition" in the present invention denotes a strength to the extent that both of the substrate and the volume hologram layer of the volume hologram sheet for a thread does not cause rupture, and the like by the tensile stress or the shear stress applied at the time of introducing the volume hologram sheet to be embedded (volume hologram sheet for a thread) of the present invention into a paper medium. In the present invention, to have "a mechanical strength with respect to a tensile stress or a shear stress under a heating condition" means to have "a resistance with respect to a mechanical stress such as a tensile stress and a shear stress under a heating condition".

The "resistance with respect to a mechanical stress such as a tensile stress and a shear stress under a heating condition" denotes the nature that peeling off is not generated between the substrate and the volume hologram layer of the volume hologram sheet for a thread so as not to generate rupture, fraying or wrinkles of the layers, and the like derived therefrom due to the tensile stress or the shear stress applied at the time of introducing the volume hologram sheet to be embedded (volume hologram sheet for a thread) of the present invention into a paper medium.

Moreover, the "resistance with respect to a mechanical stress such as a compression stress under a heating condition" in the present invention denotes the nature that bubbles between the volume hologram layer and the substrate, displacement of the volume hologram layer and the substrate, and the like are not generated by the compression stress applied at the time of embedding the volume hologram sheet to be embedded (volume hologram sheet for a card) of the present invention into a card medium.

Hereafter, the "resistance with respect to a mechanical stress such as a tensile stress and a shear stress" and the "resistance with respect to a mechanical stress such as a compression stress" may be referred to as simply the resistance with respect to a mechanical stress.

The "heating condition" specifically denotes a heating condition at the time of introducing the volume hologram sheet to be embedded (volume hologram sheet for a thread) of the present invention into a paper medium, and a heating condition at the time of embedding the volume hologram sheet to be embedded of the present invention into a card medium. The heating condition at the time of introducing the volume hologram sheet to be embedded into a paper medium specifically represents a heating condition in a range of 90° C. to 110° C. Moreover, the heating condition at the time of introducing the volume hologram sheet to be embedded into a card medium specifically represents a heating condition in a range of 120° C. to 180° C.

Moreover, in the present invention, the condition of providing a sufficient resistance with respect to a mechanical stress at the time of processing under a heating condition of the volume hologram sheet to be embedded is found out to be the peeling strength of 25 gf/25 mm or more of the volume hologram layer and the substrate. By use of the condition, effects of effectively carrying out design before production of the volume hologram sheet to be embedded and inspection after production can also be achieved.

Specifically, in the case of producing the volume hologram sheet to be embedded, it can be carried out while adjusting the composition of the materials used for each member, designing a combination of the members, and the like so that the peeling strength of the volume hologram layer and the substrate becomes in the above-mentioned range.

Moreover, the produced volume hologram sheet to be embedded can be subjected to inspection for the peeling strength of the volume hologram layer and the substrate to know whether it can be used or not.

Hereafter, the configurations used in the volume hologram sheet to be embedded of the present invention will be explained, respectively.

1. Volume Hologram Layer

First, the volume hologram layer in the present invention will be explained. The volume hologram layer used in the present invention has a function of recording a refractive index difference by the principle of the volume hologram, and thereby realizing an optical image.

Moreover, the volume hologram layer used in the present invention has a configuration with a substrate disposed on either one side surface using an adhesion means.

(1) Component Materials

First, the component materials used for the volume hologram layer in the present invention will be explained.

The materials for providing the volume hologram layer used in the present invention are not particularly limited as long as it can record a volume hologram, the substrate can be disposed only on one side surface of the volume hologram layer using an adhesion means, and the peeling strength of the volume hologram layer and the substrate can be a predetermined value, so that a material used for a common volume hologram layer can be used optionally. As such a material, for example, known volume hologram recording materials such as a silver salt material, a bichromic acid gelatin emulsion, a photo polymerizable resin and a photo cross-linkable resin can be presented. In particular, in the present invention, (a) a first photosensitive material containing a resin material, a photo polymerizable compound, a photo polymerization initiator and a sensitizing pigment, or (b) a second photosensitive material containing a cationically polymerizable compound, a radically polymerizable compound, a photo radical polymerization initiator, and a photo cation polymerization initiator can be used preferably.

Hereafter, the first photosensitive material and the second photo sensitive material will be explained successively.

(a) First Photosensitive Material

First, the first photosensitive material will be explained. As described above, the first photosensitive material includes a resin material, a photo polymerizable compound, a photo polymerization initiator and a sensitizing pigment.

(i) Resin Material

The resin material used in the present invention is not particularly limited as long as it can provide a volume hologram layer with the peeling strength of the volume hologram layer and the substrate to be described later of 25 gf/25 mm or more. As such a resin material to be used for the volume hologram layer, poly(meth)acrylate or a partially hydrolyzed product thereof, polyvinyl acetate or a partially hydrolyzed product thereof, polyvinyl alcohol or a partially acetalyzed product thereof, triacetyl cellulose, polyisoprene, polybutadiene, polychloroprene, polyvinyl chloride, polyallylate, chlorinated polyethylene, chlorinated polypropylene, poly-N-vinyl carbazole or a derivative thereof, poly-N-vinyl pyrrolidone or a derivative thereof, a copolymer of styrene and maleic anhydride or a half ester thereof, and a copolymer having as a polymerization component at least one selected from the copolymerizable monomer group such as acrylic acid, acrylate, acrylamide, acrylonitrile, ethylene, propylene, vinyl chloride and vinyl acetate can be used as examples. Moreover, these resins may be used as a mixture of plural kinds. In the present invention, it is preferable to use an acrylic resin as the main component out of the above-mentioned resins. Moreover, among the acrylic resins, it is particularly preferable to use a polymethyl methacrylate resin as the main component.

(ii) Photo Polymerizable Compound

As the photo polymerizable compound, photo polymerizable, photo cross-linkable monomers, oligomers, prepolymers having at least one ethylenically unsaturated bond in a molecule, or a mixture thereof described later can be used. Specifically, unsaturated carboxylic acid or salt thereof, ester of unsaturated carboxylic acid and an aliphatic polyhydric alcohol compound, an amide compound of unsaturated carboxylic acid and an aliphatic polyvaleic amine compound, can be presented.

Here, specific examples of the monomer of unsaturated carboxylic acid include acrylic acid, methacrylic acid, itaconic acid, crotonic acid, isocrotonic acid, and maleic acid. Moreover, specific examples of the monomer of ester of an aliphatic polyhydric alcohol compound and unsaturated carboxylic acid include, as the acrylate, ethylene glycol diacrylate, triethylene glycol diacrylate, 1,3-butane diol diacrylate, tetramethylene glycol diacrylate, propylene glycol diacrylate, neopentyl glycol diacrylate, trimethylol propane triacrylate, trimethylol propane tri(acryloyloxy propyl) ether, and trimethylol ethane triacrylate.

As the methacrylate, tetramethylene glycol dimethacrylate, triethylene glycol dimethacrylate, neopentyl glycol dimethacrylate, trimethylol propane trimethacrylate, and trimethylol ethane trimethacrylate can be presented as examples. Moreover, as the itaconate, ethylene glycol diitaconate, propylene glycol diitaconate, and 1,3-butane diol diitaconate can be presented as examples. Moreover, as the crotonate, ethylene glycol dicrotonate, tetramethylene glycol dicrotonate, pentaerythritol dicrotonate, and sorbitol tetracrotonate can be presented as examples. Furthermore, as the isocrotonate, ethylene glycol diisocrotonate, pentaerythritol diisocrotonate, and sorbitol tetraisocrotonate can be presented as examples. Moreover, as the maleate, ethylene glycol dimaleate, triethylene glycol dimaleate, pentaerythritol dimaleate, and sorbitol tetramaleate can be presented as examples.

As the halogenated unsaturated carboxylic acid, 2,2,3,3-tetrafluoro propyl acrylate, 1H, 1H, 2H, 2H-heptadecafluoro decyl acrylate, and 2,2,3,3-tetrafluoro propyl methacrylate can be presented as examples.

Moreover, as specific examples of the monomer of an amide of unsaturated carboxylic acid and aliphatic polyvaleic amine compound, methylene bisacrylamide, methylene bismethacrylamide, 1,6-hexamethylene bisacrylamide, and 1,6-hexamethylene bismethacryl amide can be presented as examples.

(iii) Photo Polymerization Initiator

As the photo polymerization initiator used in the present invention, for example, 1,3-di(t-butyl dioxycarbonyl) benzophenone, 3,3',4,4'-tetrakis(t-butyl dioxycarbonyl) benzophenone, N-phenyl glycine, 2,4,6-tris(trichloro methyl)-s-triazine, 3-phenyl-5-isooxazolone, 2-mercaptobenzimidazole, and imidazole dimmers can be presented. In particular, it is particularly preferable that the photo polymerization initiator used in the present invention has a decomposition process after hologram recording from the viewpoint of stabilization of the recorded volume hologram. For example, organic peroxides are easily decomposed by ultraviolet ray irradiation, and thus it is preferable.

(iv) Sensitizing Pigment

As the sensitizing pigment used in the present invention, a thiopyrilium salt-based pigment, a merocyanine-based pigment, a quinoline-based pigment, a styryl quinoline-based pigment, a ketocoumarin-based pigment, a thioxanthene-based pigment, a xanthenes-based pigment, an oxonol-based pigment, a cyanine dye, a rhodamine dye, a thiopyrylium salt-based pigment, a pyrylium ion-based pigment, and a diphenyl iodonium ion-based pigment can be presented as examples.

(b) Second Photosensitive Material

Next, the second photosensitive material used in the present invention will be explained. As described above, the second photosensitive material contains a cationically polymerizable compound, a radically polymerizable compound, a photo radical polymerization initiator, and a cation polymerization initiator.

Here, in the case of using such a second photosensitive material, as the method of recording the volume hologram in the volume hologram layer, a method of directing a light beam for exposing the photo radical polymerization initiator such as a laser beam (first exposure), and then directing a light beam of a wavelength different from that of the laser beam for exposing the photo cation polymerization initiator is used.

(i) Cationically Polymerizable Compound

As the cationically polymerizable compound, from the viewpoint that polymerization of the radically polymerizable compound is carried out preferably in a composition of a relatively low viscosity, those that are liquid in a room temperature can be used preferably. As such a cationically polymerizable compound, for example, diglycerol diether, pentaerythritol polydiglycidyl ether, 1,4-bis(2,3-epoxy propoxy perfluoro isopropyl)cyclohexane, sorbitol polyglycidyl ether, 1,6-hexane diol glycidyl ether, polyethylene glycol diglycidyl ether, and phenyl glycidyl ether can be presented.

(ii) Radically Polymerizable Compound

As the radically polymerizable compound, those having at least one ethylenically unsaturated double bond in a molecule are preferable. Moreover, the average refractive index of the radically polymerizable compound used in the present invention is preferably larger than the average refractive index of the cationically polymerizable compound, and it is particularly preferably larger by 0.02 or more. This is due to formation of the volume hologram by the refractive index difference between the racially polymerizable compound and the cationically polymerizable compound. Therefore, in the case the average refractive index difference is same as or smaller than the above-mentioned value, the refractive index modulation is insufficient. As the radically polymerizable compound used in the present invention, for example, acrylamide, methacrylamide, styrene, 2-bromstyrene, phenyl acrylate, 2-phenoxy ethyl acrylate, 2,3-naphthalene dicarboxylic acid (acryloxy ethyl) monoester, methyl phenoxy ethyl acrylate, nonyl phenoxy ethyl acrylate, and β-acryloxy ethyl hydrogen phthalate can be presented.

(iii) Photo Radical Polymerization Initiator

The photo radical polymerization initiator used in the present invention is not particularly limited as long as it can produce an active radical by the first exposure at the time of recording the volume hologram so that the active radical polymerizes the radically polymerizable compound. Moreover, a sensitizer commonly regarded as a light absorbing component and an active radical generating compound or an acid generating compound may be used in combination. As such a sensitizer in the photo radical polymerization initiator, although a colored compound such as a pigment is frequently used for absorbing a visible laser beam, in the case of providing a colorless transparent hologram, it is preferable to use a cyanine-based pigment. Since the cyanine-based pigment is in general easily decomposed by a light, the pigment in the hologram is decomposed so as not to have absorption in a visible range by post-exposure in the present invention or being left for several hours to several days under an interior light or sunbeam, and as a result, a colorless transparent volume hologram can be obtained.

As the specific examples of the cyanine-based pigment, anhydro-3,3'-dicarboxy methyl-9-ethyl-2,2'thiacarbocyanine betaine, anhydro-3-carboxy methyl-3',9'-diethyl-2,2' thiacarbocyanine betaine, 3,3',9-triethyl-2,2'-thiacarbocyanine.iodate, 3,9-diethyl-3'-carboxy methyl-2,2'-thiacarbocyanine.iodate, 3,3',9-triethyl-2,2'-(4,5,4',5'-dibenzo) thiacarbocyanine.iodate, 2-[3-(3-ethyl-2-benzothiazolydene)-1-propenyl]-6-[2-(3-ethyl-2-benzothiazolidene)ethylidene imino]-3-ethyl-1,3,5-thiadiazolium.iodate, 2-[[3-allyl-4-oxo-5-(3-n-propyl-5,6-dimethyl-2-benzothiazolyliden)-ethylidene-2-thiazolynylidene]methyl]3-ethyl-4,5-diphenyl thiazolinium.iodate, 1,1',3,3,3',3'-hexamethyl-2,2'-indotricarbocyanine.iodate, 3,3'-diethyl-2,2'-thiatricarbocyanine.perchlorate, anhydro-1-ethyl-4-methoxy-3'-carboxy methyl-5'-chloro-2,2'-quinothia cyanine betaine, and anhydro-5,5'-diphenyl-9-ethyl-3,3'-disulfopropyl oxacarbocyanine hydroxide.triethyl amine salt can be presented. One kind or a combination of plural kinds thereof can be used.

As the active radical generating compound, for example, diaryl iodonium salts, or 2,4,6-substituted-1,3,5-triazines can be presented. In the case high photosensitivity is needed, it is particularly preferable to use diaryl iodonium salts. Specific examples of the diaryl iodonium salts include chlorides of diphenyl iodonium, 4,4'-dichloro diphenyl iodonium, 4,4'-dimethoxy diphenyl iodonium, 4,4'-ditertiary butyl diphenyl iodonium and 3,3'-dinitro diphenyl iodonium, bromides, tetrafluoro borate, hexafluoro phosphate, hexafluoro arsenate, hexafluoro antimonate, trifluoro methane sulfonate, and 9,10-dimethoxy anthracene-2-sulfonate. Moreover, specific examples of the 2,4,6-substituted-1,3,5-triazines include 2-methyl-4,6-bis(trichloro methyl)-1,3,5-triazine, 2,4,6-tris(trichloro methyl)-1,3,5-triazine, 2-phenyl-4,6-bis(trichloro methyl)-1,3,5-triazine, 2,4-bis (trichloro methyl)-6-(p-methoxy phenyl vinyl)-1,3,5-triazine, and 2-(4'-methoxy-1'-naphthyl)-4,6-bis(trichloro methyl)-1,3,5-triazine.

(iv) Photo Cation Polymerization Initiator

The photo cation polymerization initiator used in the present invention is not particularly limited as long as it is an initiator having a low sensitivity with respect to the first exposure at the time of recording the volume hologram but it is exposed by the post-exposure of directing a light beam of a wavelength different from that of the first exposure so as to generate a Bronsted acid or a Lewis acid for polymerizing the cationically polymerizable compound. In particular, in the present invention it is particularly preferable to use one not polymerizing the cationically polymerizable compound during the first exposure. As such a photo cation polymerization initiator, for example, diaryl iodonium salts, triaryl sulfonium salts, and iron arene complex can be presented. As a preferable example of the diaryl iodonium salts, the iodoniums shown in the photo radical polymerization initiator such as tetrafluoro borate, hexafluoro phosphate, hexafluoro arsenate, hexafluoro antimonate can be presented. As a preferable example of the triaryl sulfonium salts, triphenyl sulfonium, and 4-tertiary-butyl triphenyl sulfonium can be presented.

(2) Others

Since the volume hologram sheet to be embedded of the present invention is used while being introduced into a paper medium or being embedded in a card medium, the thickness of the volume hologram layer used in the present invention is preferably in a range of facilitating introduction into the paper medium or embedding into the card medium according to the substrate, and the like to be described later. Specifically, it is preferably in a range of 0.1 µm to 50 µm, and it is particularly preferably in a range of 1 µm to 20 µm.

2. Substrate

The substrate used in the present invention is disposed on only either one surface of the volume hologram layer using an adhesion means.

Here, the substrate in the present invention denotes those having the melting temperature higher than that of the above-mentioned heating condition. This is because in the case the melting temperature of the substrate is same as or lower than the heating condition, introduction into the paper medium or embedding into the card medium of the volume hologram sheet to be embedded of the present invention becomes difficult.

As a material for the substrate, specifically, resins including polyester resins such as polyethylene, polypropylene, polyethylene fluoride, polyvinylidene fluoride, polyvinyl chloride, polyvinylidene chloride, ethylene-vinyl alcohol copolymer, polyvinyl alcohol, polymethyl methacrylate, polyether sulfone, polyether ether ketone, polyamide, tetrafluoroethyle-perfluoloalkyl vinyl ether copolymer, and polyethylene terephthalate and plyimide resins can be presented. In particular, it is preferable to use the polyester resins. Furthermore, among the polyester resins, it is preferable to use polyethylene terephthalate.

Since a substrate made of the above-mentioned resins is used, at the time of producing a forgery prevention paper, a card, and the like using the volume hologram sheet to be embedded under a heating condition, a volume hologram sheet to be embedded having a preferable mechanical strength can be provided.

The substrate may use only one kind of the resin, or it may use a mixture of plural kinds thereof.

The substrate used in the present invention may have transparency, or it may not have transparency. Moreover, the substrate may be colored to the extent that the volume hologram layer can be recognized visibly.

In the present invention, the substrate may include an additive. As such an additive, those having a function of improving the visibility of the optical image of the volume hologram layer in the volume hologram sheet to be embedded of the present invention and those having a function of providing a design property to the volume hologram sheet to be embedded of the present invention can be presented. As such an additive, for example, coloring agents such as dyes and pigments, ultraviolet ray absorbing agents and stabilizing agents for providing the weather resistance can be presented. In the case the substrate includes an ultraviolet ray absorbing agent, it can serve also as the ultraviolet ray prevention layer to be described later. In the case the substrate serves also as the ultraviolet ray prevention layer, a substrate with the ultraviolet ray absorbing agent included can be used.

The thickness of the substrate used in the present invention is preferably in a range capable of introducing the thickness of the volume hologram sheet to be embedded of the present invention into a paper medium or embedding the same into a card according to the thickness of the volume hologram layer, and the like. More specifically, it is preferably in a range of 2 µm to 50 µm, and it is particularly preferably in a range of 6 µm to 25 µm.

3. Adhesion Means

The adhesion means used in the present invention is used for disposing the substrate on only one side surface of the volume hologram layer.

Such an adhesion means is not particularly limited as long as it can bond the volume hologram layer and the substrate such that the peeling strength of the volume hologram layer and the substrate is 25 gf/25 mm or more. Specifically, an adhesive layer and an easy adhesion process can be presented. Hereafter, the adhesive layer and the easy adhesion process will be explained, respectively.

(1) Adhesive Layer

The adhesive layer used in the present invention is formed between the volume hologram layer and the substrate for adhesion such that the peeling strength of the volume hologram layer and the substrate is 25 gf/25 mm or more.

The adhesive used for the adhesive layer is not particularly limited as long as the peeling strength of the volume hologram layer and the substrate can be in the above-mentioned range, but it is preferably a curable adhesive. Here, the "curable adhesive" in the present invention denotes the so-called thermosetting adhesives, energy line curable adhesives, and the like to be cured by formation of a mesh structure by cross-linking caused by chemical reaction by the stimulus of heat or energy line (ultraviolet ray or electron beam). Since the curable adhesive is used, a preferable mechanical strength can be provided to the volume hologram sheet to be embedded of the present invention at the time of producing a forgery prevention paper, a card, and the like under a heating condition.

In the present invention, as the curable adhesive, both a photo setting adhesive and a thermosetting adhesive can be used.

As a curable adhesive used in the present invention, in particular, it is preferable to use a thermosetting adhesive. Moreover, as the thermosetting adhesive, it is particularly preferable to use a solvent-based thermosetting adhesive. Since the solvent-based thermosetting adhesive is used, a preferable mechanical strength can be provided to the volume hologram sheet to be embedded of the present invention at the time of producing a forgery prevention paper, a card, and the like under a heating condition.

The adhesive layer may include an ultraviolet ray absorbing agent. In the case the adhesive layer includes an ultraviolet ray absorbing agent, it can serve also as the ultraviolet ray prevention layer to be described later.

The thickness of the adhesive layer is not particularly limited as long as the bonding property can be realized to the extent of having the peeling strength of the volume hologram layer and the substrate of the predetermined value, but it is preferably in a range of 1 µm to 10 µm. In the case the film thickness of the adhesive layer is lower than the above-mentioned range, it is difficult to have the peeling strength of the volume hologram layer and the substrate in the predetermined range. Moreover, in the case the film thickness of the adhesive layer exceeds the above-mentioned range, since the film thickness of the volume hologram sheet to be embedded of the present invention becomes too thick so that surface ruggedness is conspicuous in the case of being introduced into a paper medium or being embedded in a card.

(2) Easy Adhesion Process

The easy adhesion process used in the present invention is not particularly limited as long as the volume hologram layer and the substrate can be bonded such that the peeling strength of the volume hologram layer and the substrate is 25 gf/25 mm or more. For example, physical processes such as plasma process, corona discharge process, glow discharge process and flame process, and chemical processes using cromic acid, a silane coupling agent, and a primer agent can be presented.

In the present invention, a chemical process using a primer agent is particularly preferable. As the primer agent, those processed at the time of the substrate film production and those processed on the substrate film after production are both preferable. As such a substrate film processed with the primer agent, these commercially available can be used. Specifically, for example, a PET film with an easy adhesive layer A4100™, T4100™ produced by Toyobo Co., Ltd., a Teijin (registered trademark) Tetoron (registered trademark) film HPE produced by Teijin DuPont Films Japan Limited, Emblet (registered trademark) S, PTM, PET produced by Unitika Limited, and an easy adhesion material AC-X™, AC-L™, AC-W™ produced by Panac Corporation, and the like can be presented. Moreover, the primer agent for processing on the substrate film after production may be a material adheres to the volume hologram material. In particular, an acrylic resin material is preferable, and furthermore, those including as the main component a methacrylic resin such as polymethyl methacrylate and as an additive a material having a low glass transition point for improving adhesion properties are preferable. Moreover, other than the acrylic resin, a mixture of a polyurethane material and a curing agent can also be used preferably. Thereby, a preferable mechanical strength can be provided to the volume hologram sheet to be embedded of the present invention at the time of producing a forgery prevention paper, a card, and the like under a heating condition.

In the case the primer agent is present as a layer in the substrate film processed with the primer agent, the layer thickness is preferably 1 μm or less.

4. Combination of Volume Hologram Layer, Substrate and Adhesion Means

The volume hologram sheet to be embedded of the present invention is not particularly limited as long as, by combining the above-mentioned volume hologram layer, substrate and adhesion means, it has the predetermined film thickness and the peeing strength of the volume hologram layer and the substrate of 25 gf/25 mm or more. In the present invention, as the combination of the volume hologram layer, the substrate and the adhesion means, the following combinations can be used preferably.

As the combination of the volume hologram layer, the substrate, and the adhesion means, one in which the main component of the resin material used in the volume hologram layer being an acrylic resin, the substrate made of a polyester resin, and the adhesion means being an adhesive layer, and the adhesive layer using a thermosetting adhesive is preferable. Moreover, among the combinations, one in which the main component of the resin material being a polymethyl methacrylate-based resin material, the substrate made of a polyethylene terephthalate-based resin, and the adhesive layer using as the adhesive a solvent-based thermosetting adhesive is more preferable. By making the combination of the volume hologram layer, the substrate and the adhesive layer as the above-mentioned combination, a volume hologram sheet to be embedded having a preferable mechanical strength can be provided at the time of producing a forgery prevention paper, a card, and the like under a heating condition.

5. Other Members

The volume hologram sheet to be embedded of the present invention is not particularly limited as long as the volume hologram layer and the substrate are disposed using the above-mentioned adhesion means, and thus a necessary member may be added optionally. As such a member, for example, a heat seal layer disposed on the outermost layer of the volume hologram sheet of the present invention can be presented.

Moreover, as needed, the volume hologram sheet to be embedded of the present invention may be provided with other layers such as a protection layer, a colored layer, a magnetic printing layer, a fluorescent light emitting layer including an ultraviolet ray light emitting layer and an infrared ray light emitting layer, an optically variable ink layer called OVI (optical variable ink) layer and/or a resin layer, and/or a printing layer, a primer layer between the layers of the layer configuration (except between the volume hologram layer and the substrate) and/or the surface. In particular, it is effective to dispose a colored layer on the surface opposite to the surface in contact with the substrate on the volume hologram layer.

Furthermore, as needed, the volume hologram sheet to be embedded of the present invention may be provided with an ultraviolet ray prevention layer at an optional position on the side closer to the substrate with respect to the volume hologram layer.

Hereafter, the heat seal layer, the colored layer and the ultraviolet ray prevention layer will be explained.

(1) Heat Seal Layer

In the present invention, a heat seal layer may be disposed on the outermost layer of the volume hologram sheet.

Here, the heat seal layer is a heat sensitive adhesive to be molten or softened at a predetermined temperature. For example, in the case the volume hologram sheet to be embedded of the present invention is a volume hologram sheet for a thread, the heat seal layer is a heat sensitive adhesive to be molten or softened at the temperature of the drying zone of the paper producing machine used at the time of producing a forgery prevention paper, and the like using the volume hologram sheet for a thread. Moreover, for example, in the case the volume hologram sheet to be embedded of the present invention is a volume hologram sheet for a card, the heat seal layer is a heat sensitive adhesive to be molten or softened at the temperature in the press laminate process of the heat press.

As the heat seal layer, known heat sensitive adhesives based on such as ionomer resins, polyester resins, polyvinyl acetate resins, polyvinyl chloride resins, polyacrylate resins, ethylene-vinyl acetate copolymer resins, and polyvinyl alcohol resins can be used. The coating amount is in general 0.1 $g/m^2$ to 10 $g/m^2$ (dry mass equivalent). The heat seal layer may, as needed, include a blocking prevention agent, a lubricant, a coloring agent, and a fluorescent light emitting agent such as an ultraviolet ray light emitting agent and an infrared ray light emitting agent. Moreover, the heat seal layer may include an ultraviolet ray absorbing agent. In the case the heat seal layer includes an ultraviolet ray absorbing agent and it is disposed on the substrate side, it can serve also as the ultraviolet ray prevention layer to be described later.

As to the arrangement of the heat seal layer, the heat seal layer may be disposed on the outermost layer of the volume hologram sheet. For example, it may be disposed on the volume hologram layer side of the volume hologram sheet, it may be disposed on the substrate side of the volume hologram sheet, or it may be disposed both thereof.

(2) Colored Layer

Figure 3:
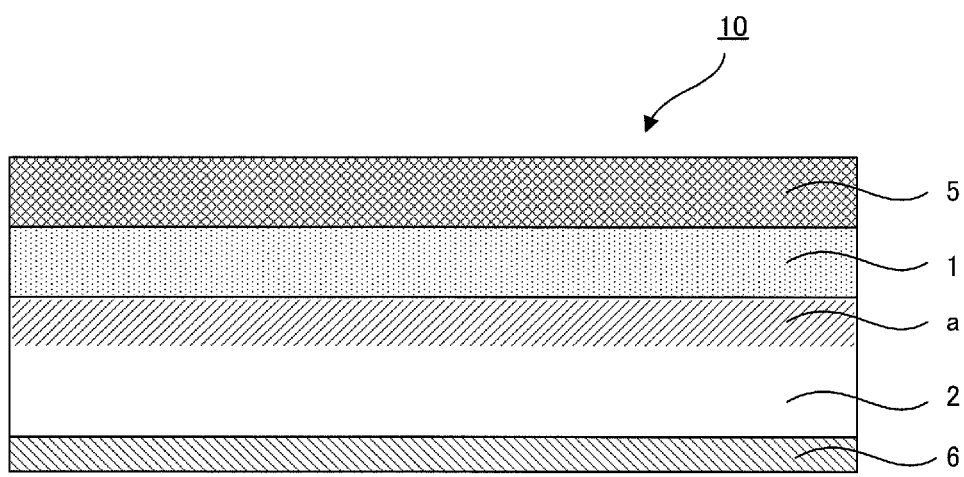
FIG. 3 is a schematic cross-sectional view showing yet another embodiment of a volume hologram sheet to be embedded of the present invention.

In the present invention, for example as shown in FIG. 3, a colored layer 5 may be disposed on the surface on the opposite side of the substrate 2 of the volume hologram layer 1.

Unlike the surface relief hologram, since the volume hologram does not require a reflection layer of an inorganic metal compound such as aluminum, effective design can be enabled by introducing a colored layer as the background of the hologram. According to the surface relief hologram requiring a reflection layer of aluminum, silver color of the aluminum is observed in any observation angle and at the same time the relief hologram is observed in a rainbow color in any angle. On the other hand, in the case of superimposing for example a red colored layer onto the volume hologram layer with a green volume hologram recorded, unique expression of the red color of the colored layer being observed in any observation angle and the green hologram image observed at the same time only in a specific observation direction can be enabled.

Moreover, in the case the volume hologram sheet to be embedded of the present invention is a volume hologram for a thread, design variation can be widened by, for example, having the colored layer color being the basic color of the thread and coordinating the colored layer color and the color applied on the surface after being introduced into the paper. For example, a colored layer color of blue, and printing on the shopping coupon surface of blue-based or a cold color of a similar shade can be presented. Moreover, in the case of a shopping coupon, by changing the thread color according to the amount, it can be distinguished. In the case of processing into a pamphlet, it can be distinguished for each page by changing the thread color.

Similarly, in the case the volume hologram sheet to be embedded of the present invention is a volume hologram sheet for a card, design variation can be widened by having the colored layer color being the basic color of the card and coordinating the colored layer color and the color applied on the card surface. For example, a colored layer color of blue, and printing on the card surface of blue-based or a cold color of a similar shade can be presented.

Moreover, the colored layer may be provided on the entire surface of the substrate, or as a pattern. In the case the colored layer is provided as a pattern, the following unique expression can be enabled. For example, in the case of superimposing a colored layer of a blue picture or letter pattern on a volume hologram layer with a green volume hologram recorded, the blue color pattern can be observed in any angle. Then, only in a specific observation angle, the green volume hologram is observed in a state superimposed on the blue colored pattern. In this case, the picture of the volume hologram may be in any positional relationship with respect to the colored layer pattern.

The colored layer may be any one provided by a known printing method and resistant to the introducing step (paper producing step) or the step of being embedded into a card medium.

(3) Ultraviolet Ray Prevention Layer

In the present invention, an ultraviolet ray prevention layer may be disposed on the substrate side surface of the volume hologram layer. The ultraviolet ray prevention layer is provided for preventing deterioration of the color and the image of the hologram image and the colored layer with the lapse of time caused by being exposed to the sunbeam or an illumination light source for a long time.

Figure 4:
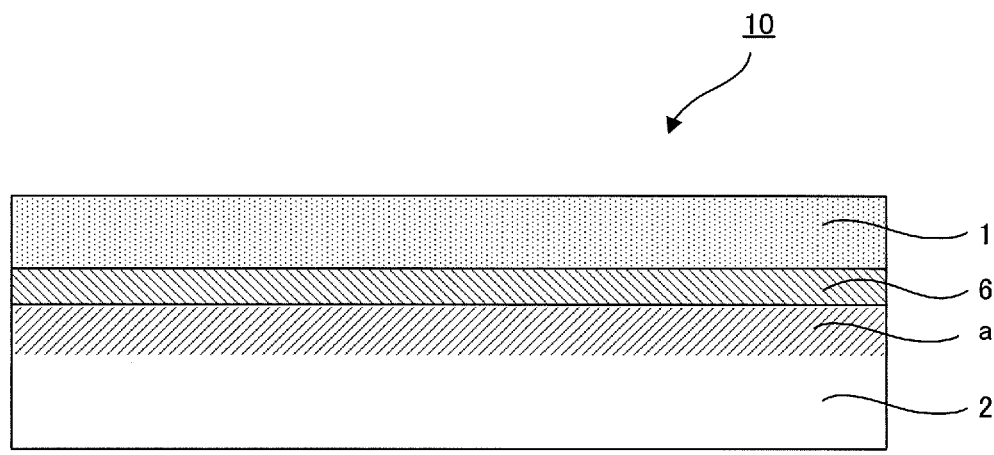
FIG. 4 is a schematic cross-sectional view showing still another embodiment of a volume hologram sheet to be embedded of the present invention.

As to the arrangement of the ultraviolet ray prevention layer, the ultraviolet ray prevention layer may be disposed on the substrate side surface of the volume hologram layer. In the case the substrate may include an ultraviolet ray absorbing agent for serving also as an ultraviolet ray prevention layer. In the case the adhesion means is an adhesive layer, the adhesive layer may include an ultraviolet ray absorbing agent for serving also as an ultraviolet ray prevention layer. Moreover, in the case the ultraviolet ray prevention layer is provided independently of the substrate or the adhesive layer; as shown in FIG. 3, the ultraviolet ray prevention layer 6 may be provided on the surface on the side opposite to the volume hologram layer 1 of the substrate 2; as shown in FIG. 4, the ultraviolet ray prevention layer 6 may be provided between the volume hologram layer 1 and the substrate 2; or although it is not shown in a figure, the ultraviolet ray prevention layer may be provide both on the surface on the side opposite to the volume hologram layer of the substrate and between the volume hologram layer and the substrate.

Also in the case the ultraviolet ray prevention layer is provided between the volume hologram layer and the substrate, sufficient adhesion force of the volume hologram layer and the substrate is needed, and thus the peeling strength of the volume hologram layer and the substrate needs to be 25 gf/25 mm or more. That is, the peeling strength of the volume hologram layer and the ultraviolet ray prevention layer is 25 gf/25 mm or more, and the peeling strength of the ultraviolet ray prevention layer and the substrate is also 25 gf/25 mm or more.

As to the ultraviolet ray prevention ability required to the volume hologram sheet of the present invention, the total absorbance of the all layers on the substrate side with respect to the volume hologram layer including the substrate is preferably 0.5 or more at a 340 nm wavelength, and it is particularly preferably 0.7 or more. If the absorbance of the all layers on the substrate side with respect to the volume hologram layer including the substrate is low, at the time of being exposed for a long time to the sunbeam or an illumination light source, the color and the image of the hologram image and the colored layer may be extremely deteriorated.

The total absorbance of the all layers on the substrate side with respect to the volume hologram layer including the substrate can be measured as follows. That is, first, the volume hologram layer is removed from the volume hologram sheet. Then, the absorbance with a 340 nm wavelength light beam incident in the film thickness direction to the film including the substrate remaining at the time is measured. The absorbance A is the value calculated by $A=-\log(I'/I)$ with the premise that the incident light intensity is I and the light intensity transmitted through the film is I'. The absorbance can be measured using for example a microscope ultraviolet ray visible near-infrared spectrophotometer MSV-350™ produced by JASCO Corporation, or a ultraviolet visible near-infrared spectrophotometer UV-3100PC™ produced by Shimadzu Corporation.

The ultraviolet ray prevention layer includes at least an ultraviolet ray absorbing agent.

As the ultraviolet ray absorbing agent, for example, an organic ultraviolet ray absorbing agent and an inorganic ultraviolet ray absorbing agent can be presented. As examples of the organic ultraviolet ray absorbing agent, specifically, ultraviolet ray absorbing agents based on salicylates, benzophenones, benzotriazoles, benzoates, substituted-acrylonitriles, nickel chelates, hindered amine-based salicylic acids, hydroquinones, and triazines can be presented. Moreover, as the inorganic ultraviolet ray absorbing agent, specifically, metal oxide fine particles of titanium oxide, zinc oxide, cerium oxide, and the like can be used widely.

Moreover, the ultraviolet ray absorbing agent may be an ultraviolet ray absorbing resin with an ultraviolet ray absorbing group bonded with a side chain. As the ultraviolet ray absorbing group, those having a structure of the organic ultraviolet ray absorbing agents and inorganic ultraviolet ray absorbing agents can be presented.

As the ultraviolet ray absorbing agent, in particular, an ultraviolet ray absorbing resin with an ultraviolet ray absorbing group bonded with a side chain can be used preferably. Since such an ultraviolet ray absorbing resin has an ultraviolet absorbing component fixed in a resin, the ultraviolet ray absorbing agent would not be transferred to the volume hologram layer. Thereby, discoloration of the hologram caused by the contact of the ultraviolet ray prevention layer and the volume hologram layer can be prevented for example. Moreover, the fixed ultraviolet ray absorbing component would not bleed out for lowering the ultraviolet ray absorbing ability.

Examples of such an ultraviolet ray absorbing resin include a copolymer of methyl methacrylate and a benzophenone-based ultraviolet ray absorbing agent (UVA635L™ produced by BASF Corp.), and a copolymer of methyl methacrylate and a benzotriazole-based ultraviolet ray absorbing agent (Vanaresin UVA-73A™ produced by Shin-Nakamura Chemical Co., Ltd., PUVA50M-40TM™ produced by Otsuka Chemical Co., Ltd., and NCI-700™, NCI-900™ produced by Nikko Kaken Co., Ltd.). However, it is not limited thereto.

Moreover, in order to obtain such an ultraviolet ray prevention layer including an ultraviolet ray absorbing resin with an ultraviolet ray absorbing group bonded with a side chain, the ultraviolet ray prevention layer may be formed by preparing as the ultraviolet ray prevention material used for formation of the ultraviolet ray prevention layer a composition including an ultraviolet ray absorbing monomer, a monomer or an oligomer and a polymer polymerizable with the ultraviolet ray absorbing monomer, and a polymerization initiator for carrying out polymerization after application. At the time, since the ultraviolet ray prevention material is a curable material, as described above, it may be an adhesive layer serving also as the ultraviolet ray prevention layer.

As the ultraviolet ray absorbing monomer, for example, benzophenone-based ultraviolet ray absorbing monomers having a polymerizable unsaturated bond, and benzotriazole-based ultraviolet ray absorbing monomers having a polymerizable unsaturated bond can be presented. As the benzophenone-based ultraviolet ray absorbing monomer having a polymerizable unsaturated bond, for example, 2-hydroxy-4-(methacryloyloxy ethoxy)benzophenone, 2-hydroxy-4-acryloyloxy benzophenone, 2-hydroxy-4-methacryloyloxy benzophenone, 2-hydroxy-4-(2-acryloyloxy) ethoxy benzophenone, and 2-hydroxy-4-(2-methacryloyloxy) ethoxy benzophenone can be presented. As the benzotriazole-based ultraviolet ray absorbing monomer having a polymerizable unsaturated bond, for example, (2-[2'-hydroxy-5'-(methacryloyloxy)ethyl phenyl]-2H-benzotriazole, 2-[2'-hydroxy-5'-(acryloyloxy)phenyl] benzotriazole, 2-[2'-hydroxy-5'-(methacryloyloxy)phenyl] benzotriazole, and 2-[2'-hydroxy-3'-t-butyl-5'-(methacryloyloxy)phenyl] benzotriazole, 2-[2'-hydroxy-5-methyl-3-vinyl phenyl] benzotriazole can be presented, however, it is not limited thereto.

As the monomer or the oligomer and the polymer polymerizable with the ultraviolet ray absorbing monomer, acrylic acid and ester thereof, methacrylic acid and ester thereof, acrylamide, methacrylamide, vinyl acetate, vinyl sulfonic acid and salt thereof, methallyl sulfonic acid and salt thereof, styrene sulfonic acid and salt thereof, and a copolymer thereof can be presented.

Moreover, the ultraviolet ray prevention layer may optionally include a binder resin. As the binder resin, for example, acrylic resins such as polymethacrylic acid, polymethacrylamide, polymethyl methacrylate, polyethyl methacrylate, and polybutyl acrylate; vinyl resins such as polyvinyl acetate, vinyl chloride-vinyl acetate copolymer, polyvinyl alcohol and polyvinyl butylal; a mixture of one or plural kinds of cellulose derivatives such as ethyl cellulose, nitro cellulose and acetic acid cellulose, polyester resins, polymethacrylate resins, polyvinyl chloride resins and silicone resins, ionizing radiation curable resins reacted with an ultraviolet ray, an electron beam, or the like, thermosetting resins, and thermoplastic resins can be presented.

6. Volume Hologram Sheet to be Embedded

The volume hologram sheet to be embedded of the present invention can be preferably introduced into a paper medium or embedded into a card as long as the peeling strength of the volume hologram layer and the substrate is 25 gf/25 mm or more.

Since the volume hologram sheet to be embedded of the present invention is used while being introduced into a paper medium or embedded in a card, the film thickness of the volume hologram sheet to be embedded of the present invention is not particularly limited as long as it can be introduced into a paper medium or embedded in a card, however, it is preferably in a range of 10 μm to 70 μm, and it is particularly preferably in a range of 20 μm to 50 μm. In the case the thickness of the volume hologram sheet to be embedded exceeds the above-mentioned range, an even film thickness can hardly be provided at the time of being introduced into a paper medium or embedded in a card. A volume hologram sheet to be embedded with the film thickness of the volume hologram sheet not satisfying the above-mentioned range can hardly be formed.

The shape of the volume hologram sheet to be embedded is not particularly limited as long as it is a shape capable of being introduced into a paper medium or embedded in a card by applying a necessary process so that it can be selected optionally according to the application. In the case the volume hologram sheet to be embedded is a volume hologram sheet for a thread, as the shape of the volume hologram sheet for a thread, specifically, slip-like, sheet-like, and a shape with a lengthy sheet taken up like a roll can be presented. Moreover, in the case the volume hologram sheet to be embedded in a volume hologram sheet for a card, the shape of the volume hologram sheet for a card may either be leaf-like or lengthy.

B. Forgery Prevention Paper

The forgery prevention paper of the present invention is characterized by use of the above-mentioned "A. Volume hologram sheet to be embedded".

According to the present invention, since the volume hologram sheet to be embedded is employed, one having high forgery prevention function can be provided without problems at the time of production.

The forgery prevention paper of the present invention in general includes the volume hologram sheet and a paper medium. Here, since the paper medium may be same as that used for a common forgery prevention paper, explanation is omitted here.

Moreover, since the production method of the forgery prevention paper of the present invention may also be same as a common production method for a forgery prevention paper, explanation is omitted here.

As the application of the forgery prevention paper of the present invention, for example, securities can be presented.

C. Card

The card of the present invention is characterized in that the volume hologram sheet to be embedded mentioned in the above-mentioned "A. Volume hologram sheet to be embedded" is disposed between two sheets.

The card of the present invention will be explained with reference to the drawings.

Figure 5A:
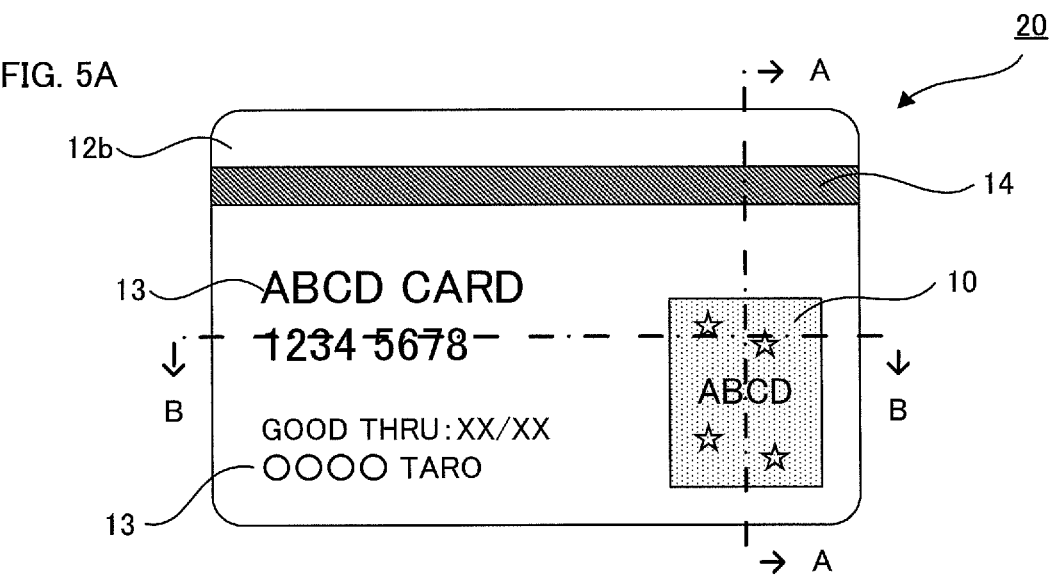
FIGS. 5A to 5C are each a schematic diagram showing an embodiment of a card of the present invention.
Figure 5B:
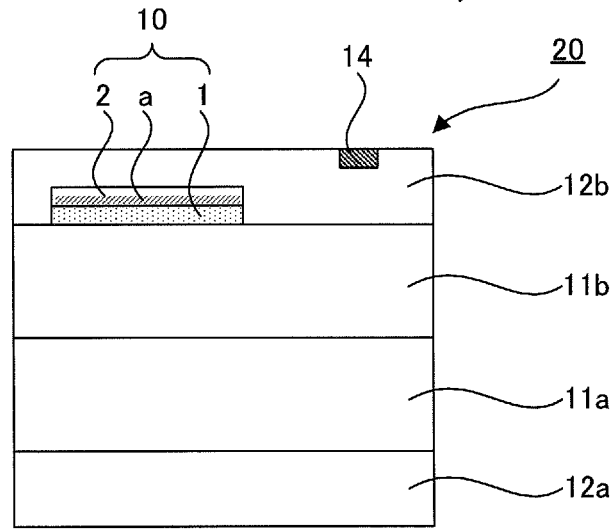
Figure 5C:
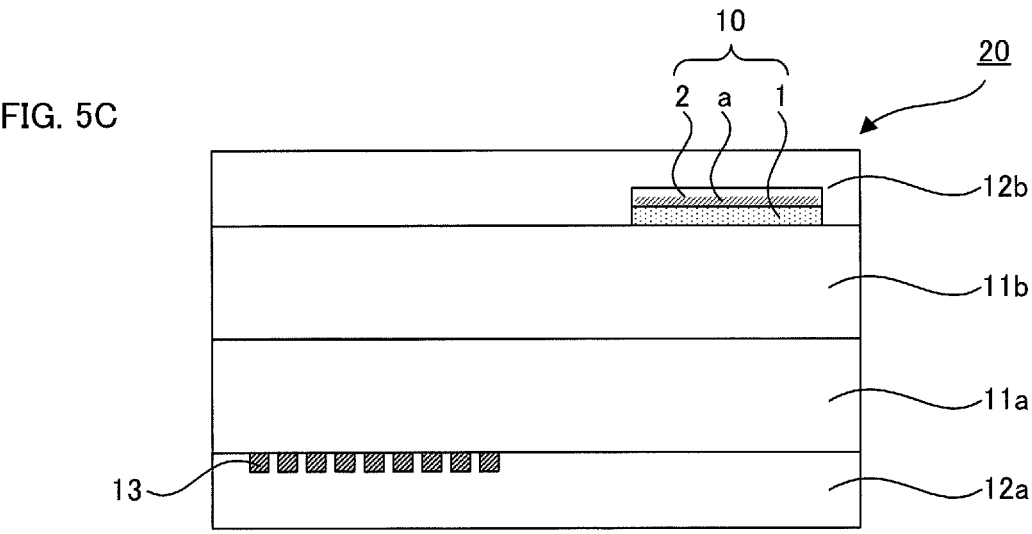

FIGS. 5A-5C are each a schematic diagram showing an embodiment of the card of the present invention. FIG. 5A is a plan view viewed from the over sheet 12b side, FIG. 5B is a cross-sectional view taken on the line A-A of FIG. 5A, and FIG. 5C is a cross-sectional view taken on the line B-B of FIG. 5(a). As shown in FIGS. 5A-5C, the card 20 comprises a four-layer laminate having an over sheet 12a, a core sheet 11a, a core sheet 11b and an over sheet 12b. A volume hologram sheet to be embedded 10 is disposed between the core sheet 11b and the over sheet 12b on the right downward corner of the card 20. The volume hologram layer 1 of the volume hologram sheet to be embedded 10 has a hologram pattern. That is, letters "ABCD" in a row and a star shape are the hologram pattern. Moreover, letters such as the card name and card number are printed on the over sheet 12a side surface of the core sheet 11a so as to form a printing layer 13. Furthermore, a magnetic recording layer 14 is embedded on the over sheet 12b surface along the longer side of the card 20.

Since the card of the present invention has the above-mentioned volume hologram sheet to be embedded, one having high forgery prevention function can be provided without problems of bubbles and displacement at the time of production. Moreover, according to the present invention, since the volume hologram sheet to be embedded is embedded inside the card, the volume hologram layer can extremely hardly be separated alone so that the forgery prevention effect can further be improved.

The card of the present invention may have the volume hologram sheet to be embedded between two sheets so that the other configurations may be same as common cards. As the card of the present invention, for example, as shown in FIGS. 5A-5C, one having the volume hologram sheet to be embedded 10 disposed between the core sheet 11b and the over sheet 12b can be presented. The embodiment shown in FIGS. 5A-5C is provided as a four-layer laminate of the over sheet 12a, the core sheet 11a, the core sheet 11b and the over sheet 12b due to the reasons such as for the accessible sheet thickness and the process of printing so that the core sheet may be one if the circumstances allow. Moreover, it is not always necessary to cover the front and rear sides with the two over sheets so that one side over sheet may be omitted.

Hereafter, configurations of the card of the present invention other than the volume hologram sheet to be embedded will be explained.

1. Core Sheet

A core sheet used in the present invention is in general made of a plastic sheet. The core sheet includes commonly a white opaque plastic sheet, but, it is not limited thereto. As the plastic sheet constituting the core sheet, for example, those using as the material polyesters such as polyvinyl chloride, polyvinyl alcohol, polysulfone, and polyethylene terephthalate, and plastics such as polyallylate, polycarbonate, polyamide, polyimide, cellulose diacetate, cellulose triacetate, polystyrene, acrylic, polypropylene, polyethylene and polyolefin in vinyl alcohol can be used. In the case thermal resistance is required, an amorphous polyester sheet, a sheet of a blended resin of an amorphous polyester and polycarbonate can also be used.

Moreover, in the case the core sheet is opaque, for example, a foil of metals such as aluminum and copper, paper, resin, or a paper impregnated with latex can also be used. These can be used alone or as a composite sheet of optional plural kinds. Moreover, a composite sheet of these sheets and the plastic sheet can also be used.

2. Over Sheet

The over sheet used in the present invention includes in general a plastic sheet. The over sheet includes commonly a colorless transparent plastic sheet, but, it is not limited thereto. However, regardless of it is colored or colorless, the over sheet is preferably transparent.

The plastic sheet constituting the over sheet may be same as the plastic sheet constituting the core sheet.

3. Information

In the present invention, information such as letters such as the card name and the card number, and pictures may be printed for forming a printing layer. Alternatively, the information may be emboss-processed.

As shown in FIG. 5A, the printing layer 13 may be formed on the surface of the over sheet 12a side of the core sheet 11a, although it is not shown in a figure, it may be formed; on the surface of the over sheet 12b side of the core sheet 11b, on the surface of the core sheet 11a, 11b side of the over sheet 12a, 12b, or on the surface opposite to the core sheet 11a, 11b side of the over sheet 12a, 12b.

4. Magnetic Recording Layer

In the case the card of the present invention is a magnetic card, a magnetic recording layer may be formed. The magnetic recording layer may be same as the common magnetic recording layer of a card.

5. Card

The thickness of the card of the present invention differs depending on the materials of the core sheet and the over sheet, but in general, it is about 10 μm to 5 mm. In the case of the magnetic card, for having a card based on the ISO standard, the card thickness is 0.76 mm. Moreover, in the case of an ordinary card, for example, it is common to use a four-layer configuration card (total thickness 0.76 mm) prepared by using as the core sheet a 280 μm thickness opaque polyvinyl chloride (PVC) sheet and as the over sheet a 100 μm thickness transparent polyvinyl chloride (PVC) sheet for superimposing the two core sheets with the over sheet laminated each on both sides thereof so as to be thermally pressed for lamination.

The card of the present invention may have various sizes. The card of the present invention may have a planar size of a common bank card or credit card. Specifically, it is by about 54 mm×about 86 mm by lengthwise and crosswise.

The production method of the card of the present invention may be a method of disposing a volume hologram sheet to be embedded between two sheets so that it may be same as a common card production method. For example, a card may be obtained by superimposing the over sheet, the volume hologram sheet to be embedded and the core sheet, applying press lamination by a predetermined temperature and pressure condition for lamination and integration, and punching out by a predetermined card size.

As the application of the card of the present invention, for example, an ID (identification) card, a cash card for institutions such as a bank, a credit card, and an identity document (student ID or employee ID) can be presented. Moreover, as it is not in a card style, it may be used for various certificates such as an examination admission ticket and a passport for ID, a driver's license, a card type certificate; more specifically, those representing the qualification and the grade of safety and hygiene like fire prevention, disinfection or fire prevention.

The present invention is not limited to the embodiments. The embodiments are examples, and any one having the substantially same configuration of the technological idea mentioned in the claims of the present invention for achieving the same effects is incorporated in the technological range of the present invention.

EXAMPLES

Hereafter, the present invention will be explained further specifically with reference to examples and comparative examples.

Example 1

A first laminate (mold releasing film/volume hologram layer/mold releasing film) was produced by applying a volume hologram recording material (volume hologram layer material) prepared by the following composition with gravure coating to have a 10 μm dry film thickness onto a PET film (produced by Toray Industries, Inc. LUMIRROR (registered trademark) T-60, thickness 50 μm) (mold releasing film), and laminating a PET film (produced by Tohcello, Co. Ltd., "SP-PET™", thickness 50 μm) onto the coated surface. By recording a Lippman's hologram on the first laminate using a 514 nm wavelength laser beam, heating the same at 100° C. for 10 minutes, removing one side mold releasing film, and laminating an easy adhesion process PET film (produced by Toyobo Co., Ltd., A4100™, thickness 50 μm) as the substrate onto the rear side thereof at 80° C., a lamination configuration of the substrate/volume hologram layer/mold releasing film was provided.
<Volume Hologram Recording Material>

| | |
|---|---|
| Epoxy group-containing acrylic resin: Blemmer-CP-50M ™ (produced by NOF Corporation) (mass average molecular weight 10,000, epoxy equivalent 310 g/eq.): | 17 mass parts |
| Polyvinyl acetate: Denka Saknohol SN-08H ™ (produced by Denki Kagaku Kogyo Kabushiki Kaisha) (polymerization degree 800): | 17 mass parts |
| 1,6-hexane diol diglycidyl ether (Denacol EX-212 ™; produced by Nagase Chemtex corporation): | 25 mass parts |
| Diphenoxy ethanol fluorine diacrylate (BPEFA ™; produced by Osaka Gas Chemicals Co., Ltd.): | 35 mass parts |
| Diaryl iodonium salt (PI2074 ™; produced by Rhodia): | 4 mass parts |
| 2,5-bis(4-diethyl amino benzylidene) cyclopentanone: | 1 mass part |
| Methyl isobutyl ketone: | 100 mass parts |
| butanol: | 100 mass parts |

A volume hologram sheet was obtained by applying a fixation process of a hologram to the obtained laminated configuration by a 2,500 mJ/cm² irradiation amount utilizing a high pressure mercury lamp and removing the mold releasing film. The peeling strength of the substrate and the volume hologram layer of the volume hologram sheet was 30 gf/25 mm.

The peeling strength and the respective peeling strength in the following Examples and Comparative Examples were measured based on the 180-degree peeling test of JIS 20237. Specifically, it is a value of the peeling strength between the substrate film and the volume hologram layer measured at the time of attaching onto a polished SUS substrate the volume hologram sheet cut out by a 25 mm width and a 150 mm length with a double side adhesive tape attached on the substrate side, and peeling off the substrate film by a 300 mm/minute tensile rate condition in a state with the peeling operation carried out stably. As the tensile tester, an Instron 5565™ type material tester was used.

Example 2

By recording a Lippman's hologram on the first laminate of the Example 1 using a 514 nm wavelength laser beam, heating the same at 100° C. for 10 minutes, applying a fixation process of a hologram by a 2,500 mJ/cm² irradiation amount utilizing a high pressure mercury lamp, temporarily removing one side mold releasing film, and applying by a 3 μm thickness an aliphatic ester-based polyurethane adhesive of the following composition onto the removed surface as a solvent-based thermosetting adhesive layer, an adhesive layer was provided.
<Adhesive Layer Material>

| | |
|---|---|
| Polyol component (produced by Mitsui Chemicals, Inc. Takerakku (registered trademark) A-505): | 30 mass parts |
| Isocyanate component (produced by Mitsui Chemicals, Inc. Takenate (registered trademark) A-20): | 2 mass parts |
| Solvent (ethyl acetate): | 70 mass parts |

On the coating surface as the substrate, a PET film (produced by Toray Industries, Inc. LUMIRROR (registered trademark) T-60, thickness 25 μm) was laminated in an ordinary temperature for carrying out aging at 40° C. for 3 days. Thereafter, the other mold releasing film was removed for obtaining a volume hologram sheet. The peeling strength of the substrate and the volume hologram layer of the volume hologram sheet was 1.4 kgf/25 mm.

Example 3

A volume hologram sheet was obtained in the same manner as in the Example 1 except that an easy adhesion process PET film (produced by Toyobo Co., Ltd., T4100™, thickness 16 μm) was used instead of the substrate of the Example 1. The peeling strength of the substrate and the volume hologram layer of the volume hologram sheet was 25 gf/25 mm.

Example 4

A volume hologram sheet was obtained in the same manner as in the Example 1 except that an easy adhesion process PET film (produced by Unitika Limited, Emblet (registered trademark) PTM-12, thickness 12 μm) was used instead of the substrate of the Example 1. The peeling strength of the substrate and the volume hologram layer of the volume hologram sheet was 57 gf/25 mm.

Example 5

A volume hologram sheet was obtained in the same manner as in the Example 1 except that a PET film (produced by Teijin DuPont Films Japan Limited, Teijin (registered trademark) Tetoron (registered trademark) film HPE-16, thickness 16 μm) with an easy adhesion process applied at the time of the film production was used instead of the substrate of the Example 1. The peeling strength of the substrate and the volume hologram layer of the volume hologram sheet was 154 gf/25 mm.

Example 6

Instead of the substrate of the Example 1, a PET substrate processed with a primer agent was used. A primer agent process layer was produced by applying a material having the following composition as an acrylic resin material as the primer agent onto the corona processed surface of a corona process PET film (produced by Toyobo Co., Ltd., E5102™, thickness 16 μm) by gravure coating so as to have a 1 μm dry film thickness.

<Primer Agent Material>

| | |
|---|---|
| Polymethyl methacrylate (weight average molecular weight 100,000): | 97 mass parts |
| Solvent (methyl ethyl ketone/toluene/ethyl acetate = 2/1/1 (mass ratio)): | 60 mass parts |

A volume hologram sheet was obtained in the same manner as in the Example 1 using as the substrate the obtained laminate of the PET film/primer agent process layer. The peeling strength of the substrate and the volume hologram layer of the volume hologram sheet was 27 gf/25 mm.

Comparative Example 1

A volume hologram sheet was obtained in the same manner as in the Example 1 except that a PET film (produced by Toray Industries, Inc. LUMIRROR (registered trademark) T-60, thickness 25 μm) without application of the easy adhesion process was used as the substrate of the Example 1 instead of a film with the easy adhesion process applied. The peeling strength of the substrate and the volume hologram layer of the volume hologram sheet was 20 gf/25 mm.

Comparative Example 2

Instead of the adhesive layer of the Example 2, a material having the following composition as a thermoplastic material was applied onto an unprocessed PET film (produced by Teijin DuPont Films Japan Limited, Teijin (registered trademark) Tetoron (registered trademark) film G2-16, thickness 16 μm) by gravure coating to have a 4 μm dry film thickness.

<Adhesive Layer Material>

| | |
|---|---|
| Polyester resin (Vylonal MD1985 ™; produced by Toyobo Co., Ltd.): | 100 mass parts |
| Solvent (water/isopropyl alcohol = 1/1 (mass ratio)): | 100 mass parts |

After having a fixation process of the hologram as in the Example 2 using as the substrate the obtained laminate of the PET film/adhesive layer, one side mold releasing film was removed so that lamination is carried out at 120° C. onto the removed surface with the adhesive layer adhered to the volume hologram layer for having a lamination configuration of substrate/volume hologram layer/mold releasing film. Thereafter, the other mold releasing film was removed so as to obtain a volume hologram sheet. The peeling strength of the substrate and the volume hologram layer of the volume hologram sheet was 22 gf/25 mm.

[Evaluation]

The volume hologram sheets obtained in the Examples 1 to 6 and the Comparative Examples 1 and 2 were slit-processed to a 2 mm width, and then their length was drawn to 150% at 100° C. At the time of drawing, Instron 5565™ type universal tester was used. In the Examples 1 to 6, the hologram images were not disturbed. Such a volume hologram sheet having the endurance with respect to drawing at the time of heating can be used preferably for a thread to be introduced into a paper. On the other hand, in the comparative Examples 1 and 2, exfoliation was generated in the volume hologram sheet, and thus the mechanical strength with respect to the tensile stress and the shear stress under a heating condition of the volume hologram sheet was insufficient.

Example 7

Onto the volume hologram layer of the laminate of the substrate (HPE-16)/volume hologram layer obtained in the same manner as in the Example 5, an ink for a colored layer of the following composition was applied with a gravure coater for having a 2 μm film thickness after drying.

<Coloring Resin Composition>

| | |
|---|---|
| Vinyl chloride-vinyl acetate resin (Solbin C ™ produced by Nisshin Chemical Industry Co., Ltd.): | 100 weight parts |
| Quinacridone-based red pigment: | 80 weight parts |
| Solvent (methyl ethyl ketone/toluene (weight ratio 1/1): | 100 weight parts |

Since the red colored layer is provided, the red color of the colored layer is observed from the all observation angles at the time of observation from the substrate side. In the observation angle range with the hologram image of the volume hologram observable, a green hologram image was observed with the colored layer red color serving as the background. Moreover, the peeling strength of the substrate and the volume hologram layer of the volume hologram sheet was 154 gf/25 mm.

Example 8

Onto the volume hologram layer of the laminate of the substrate (PTM-12)/volume hologram layer obtained in the same manner as in the Example 4, an ink for a colored layer of the following composition was applied by a 5 mm square pattern of an equal interval with a roll silk printer for having a 0.5 μm film thickness after drying.

<Coloring Resin Composition>

| | |
|---|---|
| Blue pigment-containing polyester-based resin (JET-E1 440 blue ™: produced by Seiko Advance Ltd.): | 100 weight parts |
| Isocyanate curing agent (D curing agent ™: produced by Seiko Advance Ltd.): | 5 weight parts |
| Solvent (T977 ™: produced by Seiko Advance Ltd.): | 30 weight parts |

Since the blue colored layer is provided in a pattern, the blue color of the colored layer is observed from the all observation angles at the time of observation from the substrate side. In the observation angle range with the hologram image of the volume hologram observable, a green hologram image was observed with the colored layer blue color pattern serving as the background. Moreover, the peeling strength of the substrate and the volume hologram layer of the volume hologram sheet was 57 gf/25 mm. Moreover, since the isocyanate curing agent was used, the heat resistance of the colored layer is improved.

Example 9

Cards were produced using the volume hologram sheets obtained in the Examples 3 to 5 and the Comparative Example 2.

Figure 6:
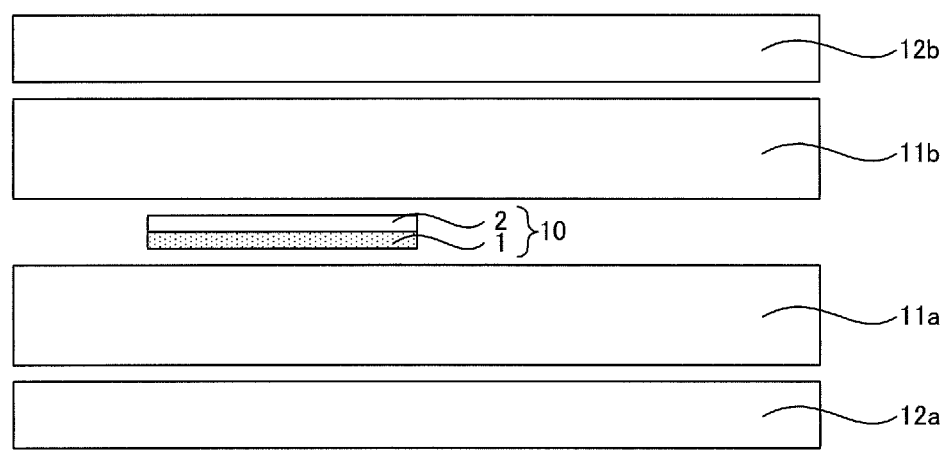
FIG. 6 is a schematic cross-sectional view showing another embodiment of a card of the present invention.

The volume hologram sheets were cut out for a 10 mm×15 mm size. As shown in FIG. 6, as the core sheets 11a, 11b, two pieces of a 0.28 mm thickness white polyvinyl chloride resin sheets were prepared for disposing the volume hologram sheet 10 on one side surface of the first core sheet 11a so as to be contacted therewith on the volume hologram layer 1 side surface. Then, as the over sheets 12a, 12b, two pieces of 0.1 mm thickness transparent vinyl chloride resin sheets were prepared for superimposing the all sheets in the order shown in FIG. 6. That is, they were superimposed in the order of the transparent over sheet 12b, the white core sheet 11b, the white core sheet 11a with the volume hologram sheet 10 disposed (they were disposed such that the volume hologram sheet 10 side surface was contacted with the white core sheet 11b), and the transparent over sheet 12a. The all sheets superimposed were heat-pressed in a 150° C. temperature, 25 kg/cm² transfer pressure, and a 15 minute pressurizing time condition. Thereafter, they were punched out to a predetermined card size.

According to the cards using the volume hologram sheets of the Examples 3 to 5, the volume hologram images were not disturbed. On the other hand, in the case of using the volume hologram sheet of the Comparative Example 2, the volume hologram image was distorted. The distortion was caused by bubbles between the PET film and the volume hologram layer of the volume hologram sheet and displacement of the PET film and the volume hologram layer at the end face of the volume hologram sheet.

Example 10

An ultraviolet ray prevention material prepared by the following composition was applied onto an easy adhesion process PET film (produced by Unitika Ltd., Emblet (registered trademark) PTM-12, thickness 12 µm) for having a 1 µm dry film thickness by gravure coating.
<Ultraviolet Ray Prevention Material>

| | |
|---|---|
| Copolymer resin with an ultraviolet ray absorbing group bonded with a side chain (produced by BASF Corp., UVA-635L ™): | 100 weight parts |
| Solvent (methyl ethyl ketone/toluene = 1/1 (weight ratio)): | 200 weight parts |

Next, a volume hologram sheet was obtained by providing a volume hologram layer in the same method as in the Example 1 onto the coating surface of the ultraviolet ray prevention material.

The peeling strength of the substrate and the volume hologram layer of the volume hologram sheet was 48 gf/25 mm.

Moreover, the volume hologram layer was removed from the volume hologram sheet for measuring the absorbance at the 340 nm wavelength using a ultraviolet visible near-infrared spectrophotometer UV-3100PC™ produced by Shimadzu Corporation and it was found to be 1.3.

Example 11

An ultraviolet ray prevention material prepared by the following composition was applied onto an easy adhesion process PET film (produced by Teijin DuPont Films Japan Limited, Teijin (registered trademark) Tetoron (registered trademark) film HPE-16, thickness 16 µm) for having a 2 µm dry film thickness by gravure coating.
<Ultraviolet Ray Prevention Material>

| | |
|---|---|
| Urethane acrylate (The Nippon Synthetic Chemical Industry Co., Ltd. Shikoh (registered trade mark) UV-7630B: | 36 weight parts |
| Ultraviolet ray absorbing monomer (2-[2'-hydroxy-5'-(methacryloyloxy) ethyl phenyl]-2H-benzotriazole) (product name "RUVA-93 ™", produced by Otsuka Chemical Co., Ltd.): | 4 weight parts |
| Initiator (Irgacure 184 ™ produced by Ciba Specialty Chemicals K.K.): | 1 weight part |
| Initiator (2,4,6-trimethyl benzoyl diphenyl phosphine oxide) ("Lucirin TPO ™", produced by BASF Corp.): | 0.3 weight part |
| Solvent (methyl ethyl ketone/toluene = 1/1 (weight ratio)): | 100 mass parts |

Next, a volume hologram sheet was obtained by providing a volume hologram layer on the coating surface of the ultraviolet ray prevention material in the same manner as in the Example 1. At the time of the fixation process of the hologram using a high pressure mercury lamp, the ultraviolet ray prevention layer made of the ultraviolet ray prevention material was also cured using the high pressure mercury lamp.

The peeling strength of the substrate and the volume hologram layer of the volume hologram sheet was 144 gf/25 mm.

The volume hologram layer was removed from the volume hologram sheet for measuring the absorbance at the 340 nm wavelength and it was found to be 0.8.

Example 12

An adhesive layer serving also as an ultraviolet ray prevention layer was formed on an unprocessed PET film (produced by Toray Industries, Inc. LUMIRROR (registered trademark) T-60, thickness 25 µm) by applying a composition prepared by the following composition to have a 2 µm dry film thickness by gravure coating.

<Material for adhesive layer serving also as ultraviolet ray prevention layer>

| | |
|---|---|
| Main agent of the two component blending type acrylic adhesive: acrylate copolymer resin solution (produced by Soken Chemical & Engineering Co., Ltd., product name: SK-Dyne 2094 ™) (resin solid component 25%): | 8 weight parts |
| Curing agent of the two component blending type acrylic adhesive: polyfunctional epoxy-based cross-linking agent (produced by Soken Chemical & Engineering Co., Ltd., product name: E-5XM ™) (solid component 5%): | 0.02 weight part |
| Ultraviolet ray absorbing monomer (2-[2'-hydroxy-5'-(methacryloyloxy) ethyl phenyl]-2H-benzotriazole (product name "RUVA-93 ™" produced by Otsuka Chemical Co., Ltd.): | 4 weight parts |
| UV curable urethane acrylate oligomer (produced by The Nippon Synthetic Chemical Industry Co., Ltd., Shikoh (registered trademark) UV-3520T): | 30 weight parts |
| Initiator (Irgacure 184 ™ produced by Ciba Specialty Chemicals K.K.): | 1 weight part |
| Initiator (2,4,6-trimethyl benzoyl diphenyl phosphine oxide) ("Lucirin TPO ™", produced by BASF Corp.): | 0.3 weight part |
| Solvent (methyl ethyl ketone/toluene = 1/1 (weight ratio)): | 100 mass parts |

Next, a volume hologram sheet was obtained by providing a volume hologram layer on the coating surface of the composition in the same manner as in the Example 1. At the time of the fixation process of the hologram using a high pressure mercury lamp, the adhesive layer serving also as the ultraviolet ray prevention layer was also cured using the high pressure mercury lamp.

The peeling strength of the substrate and the volume hologram layer of the volume hologram sheet was 42 gf/25 mm.

The volume hologram layer was removed from the volume hologram sheet for measuring the absorbance at the 340 nm wavelength and it was found to be 0.9.

[Evaluation]

The volume hologram sheets obtained in the Examples 9 to 11 were slit-processed to a 2 mm width, and then their length was drawn to 150% at 100° C. Also in this case, the hologram images were not disturbed. Moreover, after a 100 hour light resistance test using Suntest XLS+™ produced by Atlas Corp., hologram image deterioration was not observed.

REFERENCE SIGNS LIST

1 volume hologram layer
2 substrate
3 adhesive layer
5 colored layer
6 ultraviolet ray prevention layer
10 volume hologram sheet to be embedded
11a, 11b core sheet
12a, 12b over sheet
a easy adhesion process

The invention claimed is:

1. A card comprising
a core sheet,
a volume hologram sheet, and,
a over sheet,
wherein the volume hologram sheet is embedded between the core sheet and the over sheet,
wherein the volume hologram sheet consisting of a volume hologram layer, a substrate, and an adhesion means,
a film thickness of the volume hologram sheet in a range of 20 μm to 50 μm,
the core sheet and the over sheet are made from similar materials,
a peeling strength of the volume hologram layer and the substrate is 144 gf/25 mm or more, and
wherein the adhesion means is laminated in between a first surface of the volume hologram layer and the substrate, and a second surface of the volume hologram layer is in direct contact with the core sheet with no adhesive material between the second surface of the volume hologram layer and the core sheet.

2. The card according to claim 1, wherein a main component of a resin material used in the volume hologram layer is an acrylic resin material, and the substrate is made of a polyester resin.

3. The card according to claim 1, wherein the adhesion means is an adhesive layer, and an adhesive used for the adhesive layer is a curable adhesive.

4. The card according to claim 3, wherein the adhesion layer comprises a polyol component and an isocyanate component.

5. The card according to claim 1, wherein the adhesion means is an easy adhesion-surface on the substrate and the easy adhesion-surface is formed by applying a primer agent on the surface of the substrate.

6. The card according to claim 1, wherein the over sheet is transparent and the core sheet is opaque.

7. The card according to claim 1, wherein the volume hologram layer comprises epoxy group-containing acrylic resin, polyvinyl acetate, 1,6-hexane diol diglycidyl ether, diphenoxy ethanol fluorine diacrylate, diaryl iodonium salt, and 2,5-bis(4-diethyl amino benzylidene)cyclopentanone.

8. The card according to claim 1, wherein the peeling strength is measured based on the 180-degree peeling test.

* * * * *